United States Patent
Shevade et al.

(10) Patent No.: US 12,021,743 B1
(45) Date of Patent: Jun. 25, 2024

(54) SOFTWARE-DEFINED MULTI-NETWORK-SEGMENT GATEWAYS FOR SCALABLE ROUTING OF TRAFFIC BETWEEN CUSTOMER-PREMISE NETWORK SEGMENTS AND CLOUD-BASED VIRTUAL NETWORKS

(71) Applicant: Amazon Technologies, Inc., Seattle, WA (US)

(72) Inventors: Upendra Bhalchandra Shevade, Washington, DC (US); James Michael Lamanna, Woodinville, WA (US); Ethan Joseph Torretta, Edmonds, WA (US); Manish Gilani, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/190,888

(22) Filed: Mar. 27, 2023

(51) Int. Cl.
*G06F 15/16* (2006.01)
*H04L 45/02* (2022.01)
*H04L 45/42* (2022.01)
*H04L 45/50* (2022.01)

(52) U.S. Cl.
CPC .............. *H04L 45/42* (2013.01); *H04L 45/04* (2013.01); *H04L 45/50* (2013.01)

(58) Field of Classification Search
CPC .......... H04L 45/04; H04L 45/42; H04L 45/50
USPC .......................................................... 709/238
See application file for complete search history.

(56) References Cited

U.S. PATENT DOCUMENTS

| | | | |
|---|---|---|---|
| 6,006,272 A | 12/1999 | Aravamudan et al. | |
| 6,993,021 B1 | 1/2006 | Chuah et al. | |
| 7,274,706 B1 | 9/2007 | Nguyen | |
| 7,468,956 B1 | 12/2008 | Leelanivas | |
| 7,660,265 B2* | 2/2010 | Kreuk | H04L 63/0272 370/254 |
| 7,782,782 B1 | 8/2010 | Ferguson et al. | |
| 7,865,586 B2 | 1/2011 | Cohn | |
| 7,869,442 B1 | 1/2011 | Kamboh | |
| 8,160,056 B2* | 4/2012 | Van der Merwe | H04L 45/04 709/239 |
| 8,194,554 B2* | 6/2012 | Bragg | H04L 45/50 370/241 |
| 8,244,909 B1 | 8/2012 | Hanson et al. | |

(Continued)

OTHER PUBLICATIONS

Albert Greenberg, et al "VL2: A Scalable and Flexible Data Center Network" Communications of the ACM, vol. 54, No. 3, Mar. 2011, pp. 1-10.

(Continued)

*Primary Examiner* — Moustafa M Meky
(74) *Attorney, Agent, or Firm* — Robert C. Kowert; Kowert, Hood, Munyon, Rankin & Goetzel, P.C.

(57) ABSTRACT

During a communication session established with a customer-premise routing information source, a route signaling node of a multi-network-segment gateway of a cloud provider network obtains respective sets of labeled routing information pertaining to multiple customer-side network segments of a customer. The route signaling node propagates the routing information to data plane nodes of the gateway. The data plane nodes utilize the routing information to forward data packets to destinations associated with particular customer-side network segments.

20 Claims, 16 Drawing Sheets

(56) References Cited

U.S. PATENT DOCUMENTS

| | | | |
|---|---|---|---|
| 8,331,371 | B2 | 12/2012 | Judge et al. |
| 8,358,658 | B2 | 1/2013 | Flynn et al. |
| 8,478,896 | B2 | 7/2013 | Ehlers |
| 8,693,470 | B1 | 4/2014 | Maxwell et al. |
| 8,788,705 | B2 * | 7/2014 | Norrman .............. H04L 45/00 709/242 |
| 8,989,131 | B2 * | 3/2015 | Adhikary .............. H04W 72/54 375/267 |
| 9,210,090 | B1 * | 12/2015 | Baldi .................... H04L 47/31 |
| 9,356,866 | B1 | 5/2016 | Sivaramakrishnan et al. |
| 9,935,829 | B1 | 4/2018 | Miller |
| 9,948,579 | B1 * | 4/2018 | Sivaramakrishnan ....................... H04L 67/1097 |
| 10,057,157 | B2 | 8/2018 | Goliya |
| 10,110,431 | B2 | 10/2018 | Ganichev |
| 10,164,868 | B2 * | 12/2018 | Cowart ................. H04L 45/50 |
| 10,263,840 | B2 | 4/2019 | Mudigonda |
| 10,313,930 | B2 * | 6/2019 | Hughes ............... H04L 12/2801 |
| 10,355,989 | B1 | 7/2019 | Panchal et al. |
| 10,382,401 | B1 | 8/2019 | Lee |
| 10,411,955 | B2 | 9/2019 | Neginhal |
| 10,735,263 | B1 | 8/2020 | McAlary et al. |
| 10,742,446 | B2 | 8/2020 | Tillotson et al. |
| 10,742,554 | B2 | 8/2020 | Deb et al. |
| 10,742,557 | B1 | 8/2020 | Miriyala et al. |
| 10,757,009 | B2 | 8/2020 | Deb et al. |
| 10,785,146 | B2 | 9/2020 | Tillotson et al. |
| 10,797,989 | B2 | 10/2020 | Tillotson et al. |
| 10,797,998 | B2 | 10/2020 | Basavaraj |
| 10,834,044 | B2 | 11/2020 | Tillotson et al. |
| 10,893,004 | B2 | 1/2021 | Tillotson et al. |
| 10,897,417 | B2 | 1/2021 | Tillotson et al. |
| 10,999,137 | B2 | 5/2021 | Cidon |
| 11,102,079 | B2 | 8/2021 | Nahar |
| 11,228,641 | B1 | 1/2022 | Wagner |
| 11,310,155 | B1 | 4/2022 | Qian et al. |
| 11,412,416 | B2 * | 8/2022 | Hughes ............... H04L 47/2441 |
| 11,451,467 | B2 | 9/2022 | Bashuman et al. |
| 11,469,998 | B2 | 10/2022 | Sanghvi |
| 11,601,365 | B2 | 3/2023 | Qian et al. |
| 11,632,268 | B2 * | 4/2023 | Sridhar ................. H04L 45/00 370/389 |
| 11,824,773 | B2 | 11/2023 | Qian et al. |
| 11,870,677 | B2 * | 1/2024 | Suryanarayana ....... H04L 49/25 |
| 2002/0116501 | A1 | 8/2002 | Ho |
| 2003/0051163 | A1 | 3/2003 | Bidaud |
| 2005/0152284 | A1 | 7/2005 | Kotha |
| 2006/0019829 | A1 | 9/2006 | Bhogavilli |
| 2008/0225875 | A1 | 9/2008 | Wray et al. |
| 2009/0304004 | A1 | 12/2009 | Huynh Van |
| 2010/0040069 | A1 | 2/2010 | Johri |
| 2010/0043068 | A1 | 2/2010 | Varadhan et al. |
| 2010/0309839 | A1 | 12/2010 | Goldshtein |
| 2013/0254766 | A1 | 9/2013 | Zuo et al. |
| 2014/0161091 | A1 * | 6/2014 | Adhikary ............. H04B 7/0452 370/329 |
| 2014/0244814 | A1 | 8/2014 | Kuzmack |
| 2015/0271268 | A1 | 9/2015 | Finkelstein |
| 2016/0182310 | A1 | 6/2016 | Gintis |
| 2016/0239337 | A1 | 8/2016 | Gu |
| 2016/0261506 | A1 | 9/2016 | Hedge |
| 2017/0063633 | A1 | 3/2017 | Goliya |
| 2017/0093866 | A1 | 3/2017 | Ben-Noon |
| 2017/0177396 | A1 | 6/2017 | Palermo et al. |
| 2018/0041425 | A1 | 2/2018 | Zhang |
| 2018/0091394 | A1 | 3/2018 | Richards |
| 2018/0234259 | A1 | 8/2018 | Du et al. |
| 2018/0287905 | A1 | 10/2018 | Mehta |
| 2019/0026082 | A1 | 1/2019 | Shalev |
| 2019/0052604 | A1 | 2/2019 | Coleman |
| 2019/0208008 | A1 | 7/2019 | Tan |
| 2019/0230030 | A1 | 7/2019 | Eswara |
| 2019/0268421 | A1 | 8/2019 | Markuze et al. |
| 2019/0319894 | A1 | 10/2019 | Tang |
| 2019/0392150 | A1 | 12/2019 | Shevade |
| 2020/0007437 | A1 | 1/2020 | Keshava et al. |
| 2020/0092193 | A1 | 3/2020 | Tillotson et al. |
| 2020/0106744 | A1 | 4/2020 | Miriyala |
| 2020/0162362 | A1 | 5/2020 | Deb et al. |
| 2020/0204492 | A1 | 6/2020 | Sarva et al. |
| 2020/0274952 | A1 | 8/2020 | Waskiewicz |
| 2021/0359948 | A1 | 11/2021 | Durrani |
| 2022/0286489 | A1 | 9/2022 | Trussart |
| 2022/0321469 | A1 | 10/2022 | Qian et al. |
| 2022/0321471 | A1 | 10/2022 | Deb et al. |
| 2023/0079670 | A1 | 3/2023 | Deb et al. |
| 2023/0179517 | A1 | 6/2023 | Qian et al. |

OTHER PUBLICATIONS

Chuanxiong Guo, et al "BCube: A High Performance, Server-centric Network Architecture for Modular Data Centers" SIGCOMM'09 Aug. 17-21, pp. 1-12.

"On the Impact of Packet Spraying in Data Center Networks", Advait Dixit, et al., 2013, pp. 1-9.

E. Rosen and Y. Rekhter, "BGP/MPLS IP Virtual Private Networks (VPNs)," Networking Working Group, The Internet Society Feb. 2006, pp. 1-47.

U.S. Appl. No. 18/160,997, filed Jan. 27, 2023, Baihu Qian, et al.

U.S. Appl. No. 17/218,039, filed Mar. 30, 2021, Bashuman Deb, et al.

U.S. Appl. No. 18/190,891, filed Mar. 27, 2023, Shevade, et al.

U.S. Appl. No. 17/385,778, filed Jul. 26, 2021, Meher Aditya Kumar Addepalli.

U.S. Appl. No. 18/339,189, filed Jun. 21, 2023, Bashuman Deb.

* cited by examiner

A customer of an SGS uses a workflow which includes several programmatic interactions to set up an end-to-end network segment (ENS) which comprises a customer-side virtual network, a cloud-side virtual network and an MNSG  1501

A template for setting up similar ENSs is created and stored at the SGS – e.g., in response to a request from the customer for creation of a template, or automatically by the SGS control plane (without a customer request to create the template)  1504

The customer is provided access to a set of templates for ENS creation via the SGS programmatic interfaces  1507

The customer fills out a selected template when a new ENS is to be established  1510

The configuration tasks needed to establish the new ENS are performed by the SGS control plane nodes using the information filled out in the template, reducing the number of steps/tasks the customer has to perform  1513

*FIG. 15*

SOFTWARE-DEFINED MULTI-NETWORK-SEGMENT GATEWAYS FOR SCALABLE ROUTING OF TRAFFIC BETWEEN CUSTOMER-PREMISE NETWORK SEGMENTS AND CLOUD-BASED VIRTUAL NETWORKS

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine of a cloud provider network to be shared among multiple users by providing each user with one or more virtual machines hosted by the single physical computing machine. Each such virtual machine may be regarded as a software simulation acting as a distinct logical computing system that provides users with the illusion that they are the sole operators and administrators of a given hardware computing resource, while also providing application isolation and security among the various virtual machines. For some types of applications, customers of cloud provider networks may wish to utilize a combination of their own customer-premise computing resources and virtualized computing resources offered by the cloud provider networks.

BRIEF DESCRIPTION OF DRAWINGS

FIG. 15 is a flow diagram illustrating aspects of operations which may be performed to create end-to-end network segments using templates stored at a gateway service, according to at least some embodiments.

Figure 1:
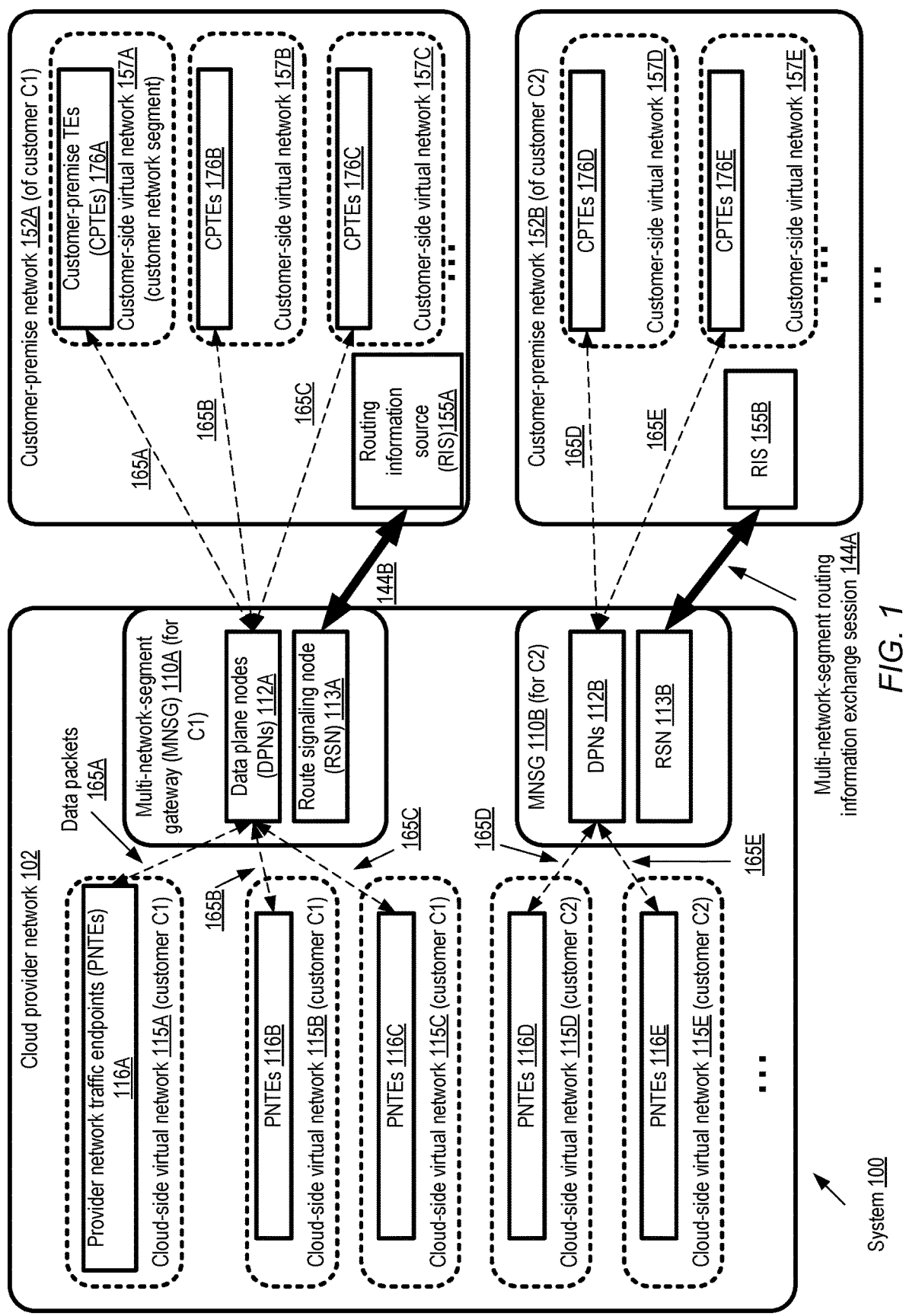
FIG. 1 illustrates an example system environment in which multi-network-segment gateways may be established by a cloud provider network to enable scalable connectivity and routing information exchanges between virtual networks set up at customer premises and virtual networks set up at the cloud provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for enabling routing of network packets of large numbers (e.g., thousands) of end-to-end network segments of a customer of a cloud provider network using a software-defined multi-network-segment gateway (MNSG) managed by a service of the cloud provider network. A given end-to-end network segment (ENS) can, for example, include one or more virtual networks set up by the customer at a customer premise, one or more virtual networks set up on behalf of the customer at a virtualized computing service (VCS) of the cloud provider network, and one or more pathways (including nodes of the MNSG, as well as network links) for transferring packets between the two types of virtual networks. The network traffic of each ENS can be logically isolated from the traffic of any other ENS, thereby affording substantial flexibility regarding network configuration decisions (such as assignment of Internet Protocol (IP) addresses to resources within the virtual networks at either end) to the customer. The virtual networks set up at the customer premise can be referred to as customer-side virtual networks or customer-side network segments, while the virtual networks set up at the VCS for the customer can be referred to as virtual private clouds (VPCs), isolated virtual networks (IVNs) or cloud-side virtual networks.

In some embodiments, the cloud provider network can include a software-defined gateway service (SGS) for managing MNSGs. A given MNSG set up for a customer using SGS resources can include multiple nodes, including at least one route signaling node (RSN) and a set of data plane nodes (DPNs). The RSN can establish a typically long-lasting routing information exchange session (e.g., using a version or variant of the Border Gateway Protocol of BGP, such as MP-eBGP or Multiprotocol external BGP) with a customer router located at the customer premise. Within a single such session, labeled routing information pertaining to as many virtual networks as the customer desires to set up at the premise and/or at the provider network can be exchanged. At least a portion of the routing information obtained at the RSN (including, for example, labels associated with the different ENS s) can be propagated to DPNs of the MNSG, along with configuration information and mappings pertaining to cloud-side virtual networks which form part of the ENSs. Labeled data packets (with the labels identifying the ENS to which the packets belong) can be sent from endpoints within the customer-side virtual networks to DPNs using a variety of protocols, such as MPLS/UDP (Multiprotocol Label Switching/User Datagram Protocol) and the like. Using the routing information and the cloud-side configuration information (such as mappings between the cloud-side virtual networks and customer-side virtual networks or ENSs), the DPNs can forward packets received from the customer premise to the appropriate destinations on the cloud side. Similarly, packets can be sent in the reverse direction, from the cloud-side virtual networks to the customer premise, via the DPNs using at least a portion of the exchanged routing information. Because a single session can be used for exchanging labeled routing information for hundreds or thousands of ENSs, the resource requirements for handling large numbers of customer applications that are implemented using a combination of cloud resources and customer-premise resources can be reduced substantially relative to alternative approaches. Furthermore, as the needs of a customer's applications change—e.g., as more ENSs are needed, or as the traffic levels associated with individual network segments change, the gateway service can automatically configure additional nodes (or de-commission some earlier-configured nodes) of a given MNSG set up for the customer.

As part of the scalable design of the MNSGs, the DPNs can be organized in multiple layers, including a de-multiplexing layer and a forwarding logic implementation layer. With respect to traffic flowing from the customer-premise virtual network of an ENS to a cloud-side virtual network, a de-multiplexing node (DMN) assigned to an MNSG can receive data packets, extract/examine labels associated with the packets, and forward the packets to selected forwarding logic implementation nodes (FLINs) assigned to the ENSs indicated by the labels. The FLINs can then look up the routing and configuration information pertinent to the data packets, and send the packets to the intended destinations. A FLIN can, for example, generate an encapsulated version of a data packet using an encapsulation protocol of the VCS, and cause the encapsulation packet comprising the encapsulated data packet to be transmitted over a substrate or physical network of the provider network to the destination. The DMNs, which perform relatively simple tasks, can be implemented using different types of computing resources (e.g., low-computing-capacity compute instances of the VCS) than are used for the FLINs, and the two layers of the DPNs can be scaled independently.

In addition to the DPNs and the RSNs, the gateway service can include control plane nodes (CPNs) responsible for various types of administrative tasks such as provisioning other types of nodes (RSNs, DMNs and FLINs), collecting and analyzing metrics from the other nodes, making resource modification decisions based on the metrics, and so on. The gateway service can implement a variety of programmatic interfaces which may be utilized by customers to submit various types of requests pertaining to ENS configuration and management, and the CPNs can initiate corresponding actions to fulfil the requests. For example, a customer can submit programmatic requests to create an MNSG, to establish a routing information exchange session between an MNSG and a client-side routing information source, to associate various cloud-side virtual networks with an MNSG, and so on, and the CPN can perform the requested tasks and inform the customer of the completion of the tasks. The programmatic interfaces can include, among others, a set of application programmatic interfaces (APIs), command-line tools, graphical user interfaces and the like. Such interfaces can also be used to present various metrics pertaining to MNSGs and associated ENSs to the customers.

As one skilled in the art will appreciate in light of this disclosure, certain embodiments may be capable of achieving various advantages, including some or all of the following: (a) reducing the computing and memory resources required to support large numbers of end-to-end network segments used for respective applications of cloud provider network customers, e.g., compared to approaches in which a respective gateway or networking intermediary device has to be set up for each ENS and/or (b) enhancing the user experience of administrators of ENSs, e.g., by providing easy-to-use programmatic interfaces and templates that can be employed to configure, customize and monitor the ENSs. ENSs with respective custom configurations can be set up for different use cases of a single customer if desired, and templates that can be filled out to mimic the custom configurations can be generated and stored at the cloud provider network.

According to some embodiments, a system may comprise an RSN of an MNSG of a software-defined gateway service (SGS) of a cloud provider network, a set of DMNs of the MNSG, and a set of FLINs of the MNSG. The RSN may be configured to obtain, during a particular communication session established with a customer-premise routing information source (CRIS) located at a premise of a particular customer of the cloud provider network, respective sets of labeled routing information pertaining to endpoints of a plurality of network segments of a customer network of the particular customer. For example, a first set of labeled routing information, indicating a first label associated with a first customer-side network segment may include address ranges (e.g., classless inter-domain routing or CIDR ranges) of, and routes available to or from, endpoints of the first customer-side network segment. Similarly, a second set of labeled routing information, indicating a second label associated with a second customer-side network segment may include address ranges of, and routes available to or from, endpoints of the second customer-side network segment, and so on. Routing information pertaining to a plurality of virtual networks set up at the provider network may also be sent in the reverse direction (from the RSN to the CRIS) within the same session in at least some embodiments. At least a portion of the respective sets of labeled routing information may be propagated from the RSN to a DMN of the set of DMNs of the MNSG.

The DMN may use the information provided by the RSN to determine which FLINs should be sent various labeled data packets, received at the MNSG, e.g., from the premise of the customer or from endpoints within the provider network. For example, based at least in part on detecting, using a label (included in the information provided by the RSN, and included in the data packet itself), that a first data packet is part of the network traffic of a first customer-side network segment, the DMN may forward the first data packet to a first FLIN which is assigned to process data packets of the first customer-side network segment. Similarly, a second data packet which is part of the network traffic of the second customer-side network segment may be forwarded to a second FLIN assigned to process packets of the second customer-side network segment. Respective sets of FLINs may be assigned to different ENSs in some embodiments by a control plane node (CPN) of the SGS. As indicated by their name, the DMNs may be responsible for de-multiplexing or distributing packets received at the MNSG data plane among nodes of the forwarding logic implementation layer in various embodiments.

In various embodiments, after receiving the first data packet from the DMN, the first FLIN may cause it to be transmitted to a selected destination within the provider network. The destination may be selected based at least in part on forwarding logic and routing information associated with the ENS of which the first customer-side network segment forms a part in various embodiments. For example, based at least in part on a mapping between the first customer-side network segment and a first virtual network established on behalf of the customer within the provider network, a first version of the first data packet may be transmitted to a first endpoint within the first virtual network. The mapping may have been generated by a control plane node of the SGS or the VCS of the provider network and provided to the first FLIN. In various embodiments, the first version of the first data packet may comprise an encapsulation packet, generated by the first FLIN in accordance with an encapsulation protocol of the VCS.

After receiving the second data packet from the DMN, in various embodiments the second FLIN may similarly use a mapping between the second customer-side virtual network and a second cloud-side virtual network to determine the provider network destination to which the second data packet should be transmitted. An encapsulated version of the second data packet may then be delivered sent from the second FLIN along a path which leads to the destination identified by the FLIN.

Labeled data packets may also be sent in the reverse direction (i.e., from sources within the provider network to destinations at the customer premise) via the data plane nodes of the MNSG in at least some embodiments, e.g., using a portion of the routing information obtained at the RSN and propagated to the data plane nodes of the MNSG. Such packets may also be examined first at a DMN, sent from the DMN to an FLIN selected using the labels in the packets, and then forwarded by the FLIN to the customer premise (e.g., to a router such as the CRIS set up at the customer premise). Such reverse-direction packets may be received in encapsulated form in various embodiments, and the FLINs may de-capsulate the packets in accordance with the encapsulation protocol of the VCS before forwarding them to the customer premise in such embodiments in accordance with the routing information obtained from the CRIS at the RSN. In some embodiments, labeled outbound packets from the provider network may be sent directly from the packet sources to the customer premise, without using the MNSG as an intermediary.

A variety of algorithms may be used in different embodiments to determine which particular DMN should be used to de-multiplex a particular flow of data packets, and which particular FLIN is assigned to a given flow. In some embodiments, for example, the same FLIN may be selected (e.g., using a flow hashing algorithm) for traffic of two different ENSs, while respective DMNs may be configured (using a different workload distribution algorithm) to de-multiplex the traffic of the two ENSs.

The SGS may comprise control plane nodes (CPNs) to handle scale-up and scale-down operations of the MNSGs set up for customers in various embodiments. In some embodiments, a CPN may detect that a scale-up criterion for a particular MNSG has been met, e.g., based on analyzing resource utilization data from the data plane nodes, and/or based on determining that one or more additional customer-side network segments have been established at the customer premise and associated with the MNSG. In response to determining that the scale-up criterion has been met, one or more additional data plane nodes (e.g., DMNs and/or FLINs) may be assigned to the MNSG in various embodiments. In some embodiments, the existing workload of the MNSG data plane nodes may be redistributed among the nodes (e.g., the newly-added nodes as well as the earlier-assigned nodes). In at least one embodiment, CPNs, RSNs, DMNs and/or FLINs may be implemented using compute instances of the VCS of the provider network.

According to some embodiments, at least a subset of the RSNs, DMNs and/or FLINs of an SGS may be configured in multi-tenant mode. As such, a given RSN, DMN or FLIN may be assigned to multiple MNSGs set up on behalf of different SGS customers (or multiple MNSGs set up on behalf of a single SGS customer). An RSN which is assigned to two different MNSGs may establish respective routing information exchange sessions with a pair of customer premise routing information sources in such embodiments. In at least some embodiments, the SGS may provide a programmatic interface which can be used by a customer to request a single-tenant or dedicated MNSG. If a customer requests single-tenancy via such an interface, the RSNs, DMNs and/or FLINs used for that customer's MNSG may not be shared with any other MNSGs. In some embodiments, one or both types of data plane nodes (DMNs or FLINs) may be configured in multi-tenant mode by default (i.e., unless the customer specifically requests single-tenancy for data plane nodes), while RSNs may be configured in single-tenant mode by default. In other embodiments, one or both types of data plane nodes (DMNs or FLINs) may be configured in single-tenant mode by default, while RSNs may be configured in multi-tenant mode by default.

According to some embodiments, a system may comprise a CPN, a plurality of RSNs, a plurality of DMNs and a plurality of FLINs of an SGS. The SGS may implement a set of programmatic interfaces, such as APIs, command-line tools, graphical user interfaces or web-based consoles, which can be used by clients to request various MNSG-related tasks and receive corresponding responses. In response to a programmatic gateway configuration request received from a customer of the SGS via such interfaces, a set of configuration information representing an MNSG created on behalf of the client may be stored by the CPN. The set of configuration information may indicate that the MNSG comprises at least (a) a particular RSN of the plurality of RSNs, (b) a particular DMN of the plurality of the plurality of DMNs and (c) a particular FLIN of the plurality of FLINs. The particular combination of RSNs, DMNs and FLINs that is assigned to any given MNSG may be chosen by the CPN based on a variety of factors in different embodiments, such as the measured resource utilization levels of the available nodes, proximity to the customer premise, single-tenancy requirements indicated by the customer for the MNSG, and so on.

In some embodiments, after an MNSG has been created (e.g., after metadata indicating the nodes that are assigned to the MNSG has been stored), the customer may use a separate programmatic request (which may be referred to as a peering request, a connection request, or a session request) to cause a connection or communication session to be established between the MNSG's RSN and a customer-premise routing information source (CRIS). In response to receiving such a peering request, the CPN may send information (such as an IP address of the CRIS, the protocol or protocol version to be used, security/authentication credentials, etc.) to the RSN of the MNSG which can be used by the RSN to establish the communication session with the CRIS. The communication session may, for example, use a version or variant of BGP such as MP-eBGP, or a custom routing information exchange protocol supported by the provider network, in different embodiment.

The customer may submit a virtual network attachment request via the programmatic interface in various embodiments, indicating to the CPN that the MNSG is to transfer data packets between a particular cloud-side virtual network established within the provider network on behalf of the client, and a particular customer-side virtual network configured by the customer at a location or premise external to the provider network. The information about the customer-side virtual network and the cloud-side virtual network may be added to the stored configuration information of the MNSG at the SGS by the CPN in various embodiments.

During the communication session established between the RSN and the CRIS, the RSN may exchange labeled routing information about a plurality of customer-side virtual networks and a plurality of cloud-side virtual networks whose traffic is to be routed via the MNSG in various embodiments. In response to determining that a particular data packet it has received originated at a particular customer-side virtual network associated with the MNSG, a DMN may transmit the data packet to an FLIN of the MNSG which is assigned to process traffic of that customer-side virtual network. The FLIN may then utilize at least a portion of the routing information exchanged during the session (e.g., indications of labels associated with different ENSs which each comprise at least one customer-side virtual network and at least one cloud-side virtual network) and/or other configuration information such as mappings between cloud-side virtual networks ad customer-side virtual networks to cause the data packet to be delivered to a destination within a cloud-side virtual network. An encapsulation protocol of a VCS of the provider network may be used by the FLIN to prepare an encapsulated version of the data packet in some embodiments for transmission to the destination. The routing information may also be used to transmit packets in the reverse direction via the data plane of the MNSG in various embodiments, e.g., from a source within a cloud-side virtual network to a destination within a customer-side virtual network.

According to at least some embodiments, a variety of protocols may be supported for the transmission of the data packets between the MNSG's data plane and the customer premise, such as MPLS/UDP, MPLS/GRE (MPLS over Generic Routing Encapsulation), baseline MPLS without tunneling, and the like. A customer may use the programmatic interfaces of the SGS to specify the version or variant of a particular data plane protocol to be used for their ENS s in one embodiment.

In some embodiments, a set of routing tables may be populated for each ENS. For example, an RSN of an MNSG may cause a first set of routes to be added to a first routing table associated with the MNSG for routing traffic between a particular pair of virtual networks (one customer-side virtual network and one cloud-side customer network), based on information it receives from a CRIS. The RSN may also cause a second set of routes to be added to a second routing table associated with the MNSG for routing traffic between a different pair of virtual networks (one customer-side virtual network and one cloud-side customer network), based on additional information it receives from a CRIS.

Networking links of several different types may be used for transmitting traffic (including routing information and/or data packets) between customer premises and the MNSGs in different embodiments. In one embodiment, for example, links of the public Internet may be used. In another embodiment, a dedicated high-bandwidth physical link (configured in response to a request submitted to the cloud provider network), referred to as a direct-connect link, may be used for the routing information, data packets, or both routing information and data packets. In some embodiments, a different set of network links may be used for routing information exchanged during the communication session between the RSN and the CRIS than is used for data packets.

An SGS may also be referred to as a networking service or a connectivity service. In at least some embodiments, as indicated above, an SGS may be implemented as one of a suite of services of a cloud provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a virtual private network (VPN) or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

In some embodiments, compute instances of a VCS, which may be utilized for implementing nodes of the SGS, may be launched within a VCS region, at an edge location of the VCS, or at a VCS extension location. An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers. An extension location of the VCS may comprise a portion of a client-owned or customer-owned premise at which one or more data plane servers at which VCS compute instances can be launched are located. Special highly secure channels using various kinds of tunneling technologies may be established for transmitting commands (e.g., commands to launch compute instances and/or containers) from the control plane servers of the VCS (which remain at provider network data centers) to the extension location data plane servers in various embodiments.

The cloud provider network may implement various computing resources or services, which may include, in addition to the SGS and the VCS, data processing service(s) (e.g., map reduce, data flow, and/or other large scale data processing techniques), data storage services (e.g., object storage services, block-based storage services, or data warehouse storage services), software container management services, and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services including the VCS may be implemented at one or more data centers, edge locations and/or extension locations of the provider network in different embodiments. The VCS may also be referred to as an elastic compute cloud service, an elastic compute service, a virtual machines service, a computing cloud service, a compute engine, or a cloud compute service. Such a service may offer compute instances (also referred to as guest virtual machines, or simply "instances") with varying computational and/or memory resources, which are managed by the service. In one embodiment, each of the virtual compute instances may correspond to one of several instance types or families. An instance type may be characterized by its hardware type, computational resources (e.g., number, type, and configuration of virtualized central processing units (VCPUs or VCPU cores), memory resources (e.g., capacity, type, and configuration of local memory), storage resources (e.g., capacity, type, and configuration of locally accessible storage), network resources (e.g., characteristics of its network interface and/or network capabilities), hardware accelerator resources and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. In some embodiments, instances of several different instance types may be launched at extension premises in response to programmatic requests from a client. Other types of network-accessible services, such as packet processing services, database services, wide area networking (WAN) services and the like may also be implemented at the cloud provider network in some embodiments.

In some embodiments, resources of the cloud provider network may be used to run software containers on behalf of clients. A software container represents a logical packaging of a software application that abstracts an application from the computing environment in which the application is executed. For example, a containerized version of a software application can include the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. The orchestration of such containerized applications may be conducted by a container management service or a container orchestration service of the provider network.

The traffic and operations of the cloud provider network (or individual services of the cloud provider network, including the SGS) may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a VCS) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which multi-network-segment gateways may be established by a cloud provider network to enable scalable connectivity and routing information exchanges between virtual networks set up at customer premises and virtual networks set up at the cloud provider network, according to at least some embodiments. As shown, system 100 may include a plurality of multi-network-segment gateways (MNSGs) such as MNSG 110A and MNSG 110B, set up at a cloud provider network 102 on behalf of various customers who wish to establish connectivity between their customer-side virtual networks and cloud-side virtual networks. MNSG 110A may be set up for a customer C1, and may comprise a set of data plane nodes (DPNs) 112A and at least one route signaling node (RSN) 113A, while MNSG 110B may comprise DPNs 112B and RSN 113B set up for customer C2.

Within a customer-premise network 152A of customer C1, customer-side virtual networks 157A, 157B and 157C may have been set up by C1 in the depicted embodiment. Within a customer-premise network 152B of customer C2, customer-side virtual networks 157D and 157E may have been established by C2. Each customer-premise network may comprise resources at one or more customer premises. A given customer-side virtual network may comprise a set of customer-premise traffic endpoints (CPTEs)—e.g., customer-side virtual networks 157A, 157B, 157C, 157D and 157E may respectively include CPTEs 176A, CPTEs 176B, CPTEs 176C, CPTEs 176D and CPTEs 176E in the depicted example scenario. The CPTEs may, for example, include servers or virtual machines used to implement components of various applications which require connectivity to cloud-based computing resources. Each customer-premise network may include a customer-side routing information source, such as RIS 155A in customer-premise network 152A, and RIS 155B in customer-premise network 152B. An RIS may for example, comprise a hardware router (sometimes referred to as a provider edge or PE router) or a software-defined router in different embodiments, capable of providing routing information about endpoints within various virtual networks of the corresponding customer-premise networks, and receiving routing information pertaining to other networks.

Customer C1 may implement a plurality of applications (such as various kinds of enterprise applications, telecommunication-related applications and the like, examples of which are provided below) using a combination of resources at the cloud provider network and at customer-premise network 152A. For example, one set of applications may be implemented using CPTEs 176A, and a set of provider network traffic endpoints (PNTEs) 116A within a particular cloud-side virtual network 115A set up on behalf of C1. Similarly, a second set of C1's applications may be implemented collectively at CPTEs 176B and PNTEs 116B set up within cloud-side virtual network 115B, and a third set of C1's applications may be implemented at CPTEs 176C and PNTEs 116C within cloud-side virtual network 115C. Customer C1 may eventually set up hundreds or thousands of customer-side virtual networks, corresponding cloud-side virtual networks, and have traffic routed efficiently between a given customer-side virtual network and a corresponding cloud-side virtual network without expending a lot of resources, while logically isolating the traffic between each such pair of virtual networks from the traffic between other such pairs. Customer C2 may implement one set of applications at CPTEs 176B and PNTEs 116D of cloud-side virtual network 115D, and a different set of applications at CPTEs 176C and PNTEs 116E of cloud-side virtual network 115E, and also desire efficient routing of packets for each such application with logical isolation between the traffic of different sets of the applications.

The MNSGs 110A and 110B may be configured to help achieve the efficiency and isolation objectives of the customers C1 and C2 respectively. DPNs and RSNs may be assigned to each MNSG by control plane nodes (CPNs) of a software-defined gateway service (SGS) of the provider network 102, e.g., based on programmatic requests received from the customers. An RSN 113A of MNSG 110A may establish a communication session indicated by arrow 144B with RIS 155A, and exchange labeled routing information with RIS 155A pertaining to various client-side and customer-side virtual networks of C1 during the session. For example, the routing information pertaining to a given pair of virtual networks (such as customer-side virtual network 157A and cloud-side virtual network 115A) may indicate a set of labels associated with the traffic flowing between those virtual networks, address ranges of PNTEs and CPTEs of the virtual networks, permitted routes between the PNTEs and CPTEs, and so on. The same session may be utilized for exchanging routing information and updates pertaining to hundreds or thousands of virtual network pairs (or groups of virtual networks that comprise more than two virtual networks at the customer side or the cloud side), thereby reducing the overhead that may have been incurred had multiple sessions been required. At least a portion of the routing information exchanged by RSN 113A may be propagated to some or all of the DPNs 112A of the MNSG 110A in the depicted embodiment.

Data packets may be transmitted between the CPTEs of a customer-side virtual network and the PNTEs of a corresponding cloud-side virtual network with the help of the DPNs of the MNSG set up for the virtual networks in the depicted embodiment. Each data packet may have an associated label, indicating the virtual network pair to whose traffic that data packet belongs. For example, data packets sent between CPTEs 176A and PNTEs 116A may comprise or indicate a label L1 assigned to the combination of virtual networks (157A, 115A), data packets sent between CPTEs 176B and PNTEs 116B may comprise or indicate a label L2 assigned to the combination of virtual networks (157B, 115B) and so on. Such a label may indicate an ENS established on behalf of the customer, comprising at least one customer-side virtual network and at least one cloud-side virtual network. When a data packet is received at a DPN, its label may be examined to identify which virtual networks it is associated with, and a version of the data packet may then be transmitted towards a destination in one of the virtual networks using at least a portion of the exchanged routing information. For example, data packets received from a CPTE 176A may be encapsulated by a DPN and sent over a physical or substrate network of the provider network to a server at which a PNTE 116A runs within a compute instance.

In some embodiments, as described below in further detail, the DPNs may be organized in at least two layers, with one layer comprising simple de-multiplexing nodes (DMNs) and a second layer comprising forwarding logic implementation nodes (FLINs). The DMNs may simply examine a label of a received data packet and send it on (without implementing an encapsulation algorithm) to an FLIN assigned to process packets associated with the label or ENS. The FLIN may then perform somewhat more complex routing-related tasks for the data packet, such as identifying longest-prefix-match (LPM) routes within one or more route tables set up for the ENS, consulting mappings between cloud-side virtual networks and customer-side virtual networks, etc., and cause an encapsulated version of the packet (in the case where the packet is received from the customer network and is to be sent to a destination within the provider network) to be sent along a selected route. The FLINs and/or the DMNs, along with associated routing information and virtual network mappings, may be used to transfer packets in either direction in some embodiments, from the provider network to the customer network and from the customer network to the provider network. Traffic associated with each ENS may be logically isolated (for example, some of the same IP addresses may be used for PNTEs and/or CPTEs within multiple ENS s without conflicts) from the traffic of any other ENS in the depicted embodiment. Data packets 165A may flow between customer-side virtual network 157A and cloud-side virtual network 115A and be kept logically isolated from data packets 165B (flowing between customer-side virtual network 157B and cloud-side virtual network 115B) and from data packets 165C (flowing between customer-side virtual network 157C and cloud-side virtual network 115C), for example.

Similar operations may be performed for customer C2 by the nodes of MNSG 110B in the depicted embodiment. RSN 113B of MNSG 110B may establish a communication session indicated by arrow 144A with RIS 155B, and exchange labeled routing information with RIS 155B pertaining to various client-side and customer-side virtual networks of C2 during the session. At least a portion of the routing information exchanged by RSN 113B may be propagated to some or all of the DPNs 112B of the MNSG 110B in the depicted embodiment. Data packets 165D may be transmitted between the CPTEs of a customer-side virtual network of C2 (such as CPTEs 176D) and the PNTEs of a corresponding cloud-side virtual network (such as PNTEs 116D) with the help of the DPNs of the MNSG 110B, using techniques similar to those described above for DPNs 112A. Similarly, data packets 165E may be transmitted with the help of DPNs of MNSG 110B may be transmitted between customer-side virtual network 157E and cloud-side virtual network 115E.

Figure 2:
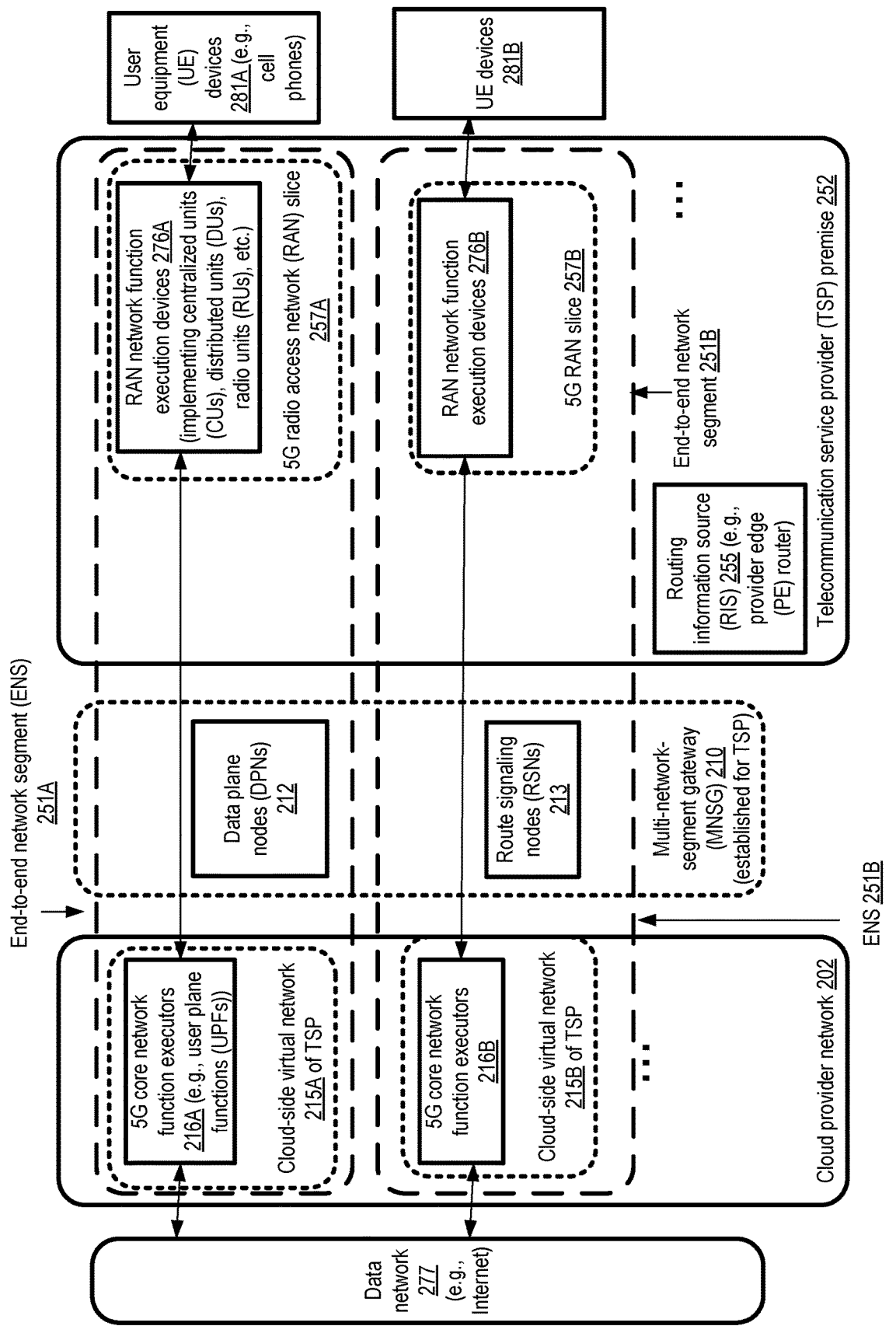
FIG. 2 illustrates an example of the use of multi-network-segment gateways for telecommunication applications, according to at least some embodiments.

FIG. 2 illustrates an example of the use of multi-network-segment gateways for telecommunication applications, according to at least some embodiments. In the embodiment depicted in FIG. 2, a telecommunication service provider (TSP) may implement one or more applications using a combination of resources located at the telecommunication service provider's own premises (such as TSP premise 252) and resources of the cloud provider network 202. Such applications may comprise, for example, 5G (Fifth Generation) private networks, 5G public networks, applications built using 4G-LTE (Fourth Generation-Long Term Evolution) technology stacks.

In the example depicted in FIG. 2, network functions of the Radio Access Network (RAN) layer of one or more such applications may be implemented at least in part within a TSP premise 252, while network functions of the 5G core network may be implemented using provider network resources. Some number of RAN network function execution devices 276A may be assigned to a 5G RAN slice 257A configured at TSP premise for one customer of the TSP, and another set of RAN network function devices 276B may be assigned to 5G RAN slice 257B configured at TSP premise 252 for a different customer of the TSP. The RAN network function execution devices of each network slice may implement, for example, network functions of 5G RAN centralized units (CUs), distributed units (DUs) and/or radio units (RUs). Radio messages associated with a set of user equipment (UE) devices 281A (such as cell phones) of one application may be processed at RAN network function execution devices 276A, and results of executing the RAN-layer network functions may be sent to 5G core network function executors 216A run within a cloud-side virtual network 215A of the TSP. The 5G core network function executors may, for example, implement user plane functions (UPFs) of the 5G technology stack in the depicted embodiment. The data received from the UE devices 281A may be transmitted over a data network 277 (which may for example include portions of the public Internet) to a set of destinations (such as other UEs, or servers which respond to data requested from the UE devices 281A). Similarly, radio messages associated with a different set of user equipment (UE) devices 281B (such as cell phones or Internet-of-Things (IoT) devices) of a second application may be processed at RAN network function execution devices 276B, and results of executing these RAN-layer network functions may be sent to 5G core network function executors 216B run within a cloud-side virtual network 215B of the TSP. The data received from the UE devices 281B may also be transmitted over a data network 277 to a different set of destinations.

5G RAN slices 257A and 257B may each be implemented using a respective virtual network (analogous to the customer-side virtual networks 157 shown in FIG. 1) configured at the TSP premise 252 in the depicted embodiment. A respective ENS 251 may be established for the traffic associated with each 5G RAN slice, with ENS 251A comprising cloud-side virtual network 215A along with 5G RAN slice 257A, and ENS 251B comprising cloud-side virtual network 215B and 5G RAN slice 257B. Packets containing 5G data and/or 5G control messages may be transmitted between the TSP premise and the provider network 202 using MNSG 210 established at the request of the TSP. An RSN 213 of the MNSG 210 may establish a communication session with a routing information source (RIS) 255 at the TSP premise 252, and that session may be used to exchange routing information for each RAN slice (on the TSP side) and the corresponding cloud-side virtual network (on the provider network side) using the label-based approaches introduced above. The exchanged routing information, as well as mappings between the virtual networks at the two sides, may be utilized by DPNs 212 of the MNSG 210 to transfer data packets originating at each of the two sides to the targeted destinations at the other side. The TSP may add more virtual networks at either side and continue to use the same MNSG to manage routing information exchanges as well as data transfers for all the virtual networks in various embodiments.

Figure 3:
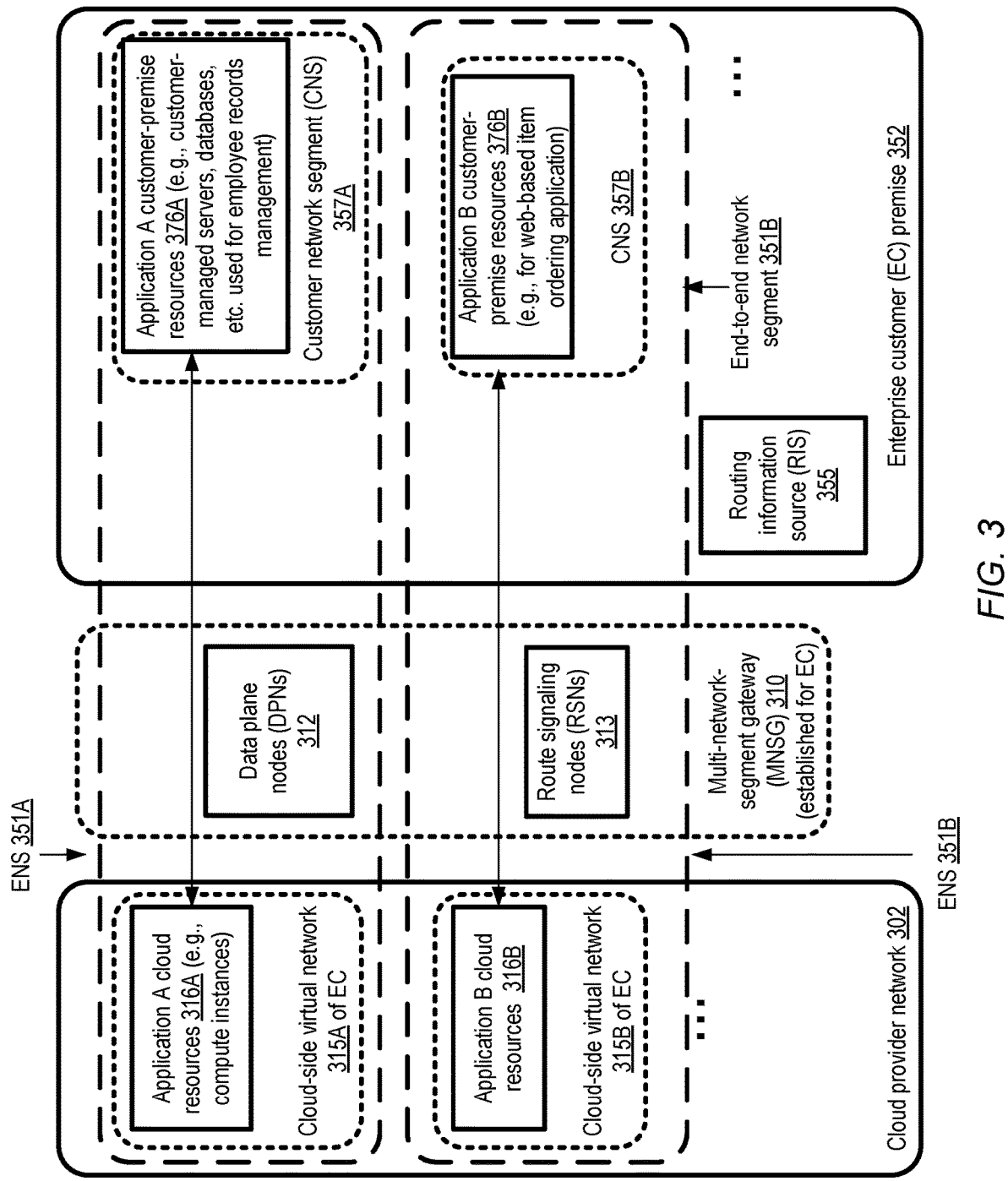
FIG. 3 illustrates an example of the use of multi-network-segment gateways for enterprise customers of cloud provider networks with numerous independently-managed applications that each utilize customer-premise resources and cloud-based resources, according to at least some embodiments.

FIG. 3 illustrates an example of the use of multi-network-segment gateways for enterprise customers of cloud provider networks with numerous independently-managed applications that each utilize customer-premise resources and cloud-based resources, according to at least some embodiments. In the example scenario depicted in FIG. 3, an enterprise customer (EC) of a cloud provider network 302 has implemented two applications, each of which uses some resources at EC premise 352 and other resources within the provider network. Application A customer-premise resources 376A configured within customer network segment (CNS) 357A may, for example, comprise a set of customer managed-servers, database systems and the like that are used for managing employee records of the enterprise. Application B customer-premise resources 376A configured within CNS 357B may be used for a web-based item ordering application that the EC implements for its own end user customers. A portion of Application A may be implemented using Application A cloud resources 316A, such as some number of compute instances of a VCS; similarly, a portion of Application B may be implemented using Application B cloud resources 316B.

For a variety of reasons, such as to simplify administration, to separate responsibilities for the applications among respective subsets of staff, and/or ensure that data of any one of the applications is kept isolated from data of the other, the EC may utilize an MNSG 310 to maintain respective ENSs for each of the applications in the depicted embodiment. ENS 351A, comprising Application A customer-premise resources 376A and Application A cloud resources (configured within cloud-side virtual network 315A) may be set up for Application A. ENS 351B comprising Application B customer-premise resources 376B and Application B cloud resources (configured within cloud-side virtual network 315B) may be set up for Application B. As and when more applications are added, more ENSs may be set up, without needing to configure new gateways or other similar networking intermediaries. In some embodiments, an easy-to-use template that can be filled out by a customer may be created for establishing an ENS, as described below in further detail. A single communication session may be established between an RSN 313 of the MNSG and a RIS 355 at the EC premise, and used to exchange routing information pertaining to all the customer network segments and cloud-side virtual networks included in the different ENSs in the depicted embodiment. DPNs 312 of the MNSG 310 may transfer data packets of each ENS from the EC premise to the provider network (and from the provider network to the EC premise) using techniques similar to those described above, in which a combination of the labels associated with the routing information and configuration information/mappings between the cloud-side and the customer-side resources of each ENS are used.

Figure 4:
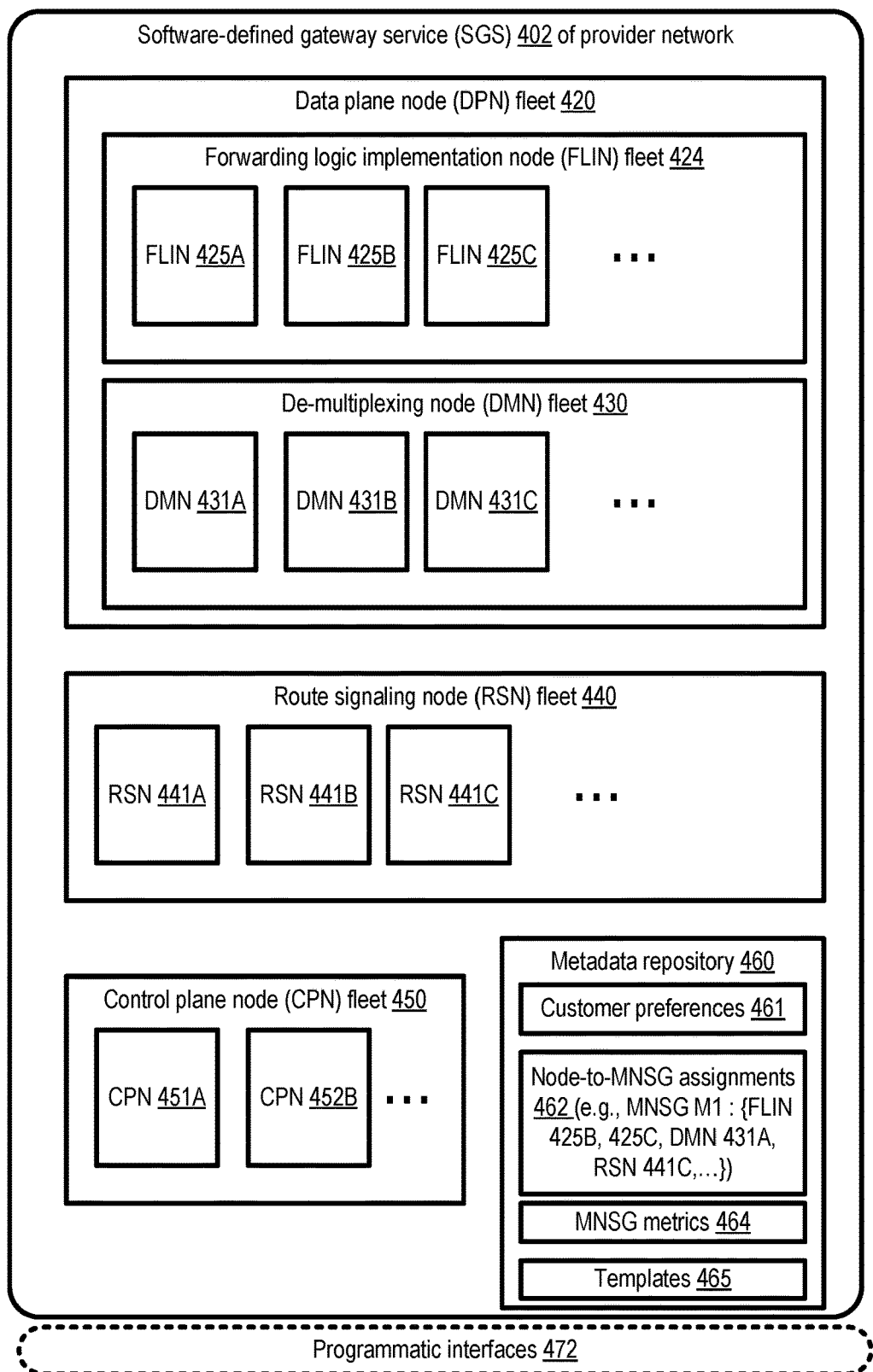
FIG. 4 illustrates an example multi-layer architecture of a software-defined gateway service of a provider network, according to at least some embodiments.

In various embodiments, as indicated above, an SGS which can be employed for setting up MNSGs of the kind introduced above may comprise several of layers, with each layer including numerous nodes. FIG. 4 illustrates an example multi-layer architecture of a software-defined gateway service of a provider network, according to at least some embodiments. SGS 402 of a provider network may include a DPN fleet 420, an RSN fleet 440, a control plane node (CPN) fleet 450, and a metadata repository 460 in the depicted embodiment. The DPN fleet 420 may itself include an FLIN fleet 424 and a DMN fleet 430. FLIN fleet 424 includes FLINs 425A, 425B and 425C. DMN fleet 430 includes DMN 431A, 431B and 431C. RSN fleet 440 (which may also be referred to as a routing plane fleet) includes RSN 441A, 441B and 441C, while CPN fleet 450 comprises CPN 451A and CPN 452B. The nodes at each of the layers or fleets may be implemented using a variety of technologies in different embodiments. In some embodiments, for example, a given FLIN, DMN, RSN and/or CPN may comprise one or more processes or threads running at a virtual machine or compute instance of the VCS, with different nodes being implemented using respective compute instances. In other embodiments, software containers may be used for at least some nodes of some fleets, and in some cases more than one software container (and hence more than one node) may be implemented within a given compute instance or within a given un-virtualized server. In one embodiment, nodes of different layers/fleets may be co-located within a given server—e.g., a DMN and at least one FLIN may be run using respective processes or threads within a single virtual or physical machine. In some embodiments, some nodes within a given fleet may be implemented using a different approach than other nodes of the same fleet—e.g., some FLINs may be implemented at respective virtual machines, while other FLINs are implemented using un-virtualized servers. In some embodiments, different types of compute instances, which may differ from one another in performance capacities, allocated memory size, etc., may be used for nodes of different layers—e.g., a compute instance with a compute capacity Cap1 and a memory size M1 may be used for a DMN, a compute instance with a compute capacity Cap2=2*Cap1 (twice the capacity of the DMN instance) and a memory size M2=4*M1 (four times the memory size of the DMN instance) may be used for a FLIN, and so on. The number of nodes within a given fleet at a given point in time may differ from the number of nodes configured within other fleets at that point in time—e.g., RSN fleet 440 may have fewer nodes at time T than FLIN fleet 424. In some embodiments, the total number of nodes in the different fleets may be adjusted over time, e.g., by a CPN, based on the changes in requirements of customers of the SGS.

The SGS 402 may implement (e.g., using CPNs) a set of programmatic interfaces 472 in the depicted embodiment, such as a set of APIs, command-line tools, graphical user interfaces, web-based consoles and the like. The programmatic interfaces may be used by customers or clients of the SGS (such as administrators employed by a telecommunication service provider or an enterprise customer) to submit programmatic requests pertaining to setting up and using MNSGs from client-side devices such as laptops, desktops, tablet computing devices, phones, and the like in various embodiments. The requests may be processed initially by the CPNs in at least some embodiments, and corresponding actions may be initiated at the SGS.

Based on the contents of requests submitted by the customers, and/or the actions initiated in response to the requests, several kinds of metadata may be stored at metadata repository 460 of SGS 402 in the depicted embodiment. The metadata may include, for example, various kinds of customer preferences 461 (such as whether a given customer wants resources to be assigned in single-tenant mode for their MNSGs, whether the customer wishes to be provided notifications automatically in response to events detected at their MNSGs (and if so how those notifications should be provided), etc.). When a CPN assigns nodes at various layers of the SGS to a given customer's MNSG in response to programmatic requests from the customer and/or in response to detecting scale-up or scale-down operations are needed, node-to-MNSG assignments 462 may be stored within metadata repository in some embodiments. For example, the assignments may indicate that a particular MNSG M1 comprises FLIN 425B and 425C, DMN 431A and RSN 441C. The DMNs of a given MNSG may be provided configuration information indicating the specific set of FLINs to which data packets associated with a given ESN or a given label should be forwarded, and how to choose the particular FLIN for a given packet. For example, a mapping or index indicating that FLIN 425B and FLIN 425C are assigned to a particular MNSG MNSG1 may be provided to each DMN 431 assigned to MNSG1, and an indication that flow hashing should be used to select the particular FLIN (FLIN 425B or FLIN 425C) for a given data packet may be provided to each DMN 431. For an MNSG comprising multiple DPMNs, the particular DMN at which a given data packet is received may be chosen at random, e.g., by a virtual load balancer associated with the MNSG in some embodiments.

In various embodiments, the CPNs may obtain or collect a variety of metrics associated with MNSGs, such as the rate at which data packets are transmitted, the number of ENSs configured using each MNSG, the number of routing changes obtained at an RSN of an MNSG over a given time interval, the number of nodes included in each MNSG at each layer as a function of time, and so on. Such MNSG metrics 464 may be included in metadata repository 460 in some embodiments, and provided to SGS customers in response to metrics requests received via the programmatic interfaces 472. In one embodiment, a dynamically-refreshed web-based console or other similar graphical interface may be used to display, in real-time, various metrics associated with a given MNSG, information about the customer-side and cloud-side virtual networks whose traffic is being managed with the help of an MNSG, status of the MNSG RSNs and DPNs, and so on.

Some customers may eventually create hundreds or thousands of ENSs of the kind discussed above. With respect to each ENS, several types of configuration information may have to be provided by the customer (e.g., via respective programmatic interactions of the kind discussed below), such as identification information of the customer-side virtual network and the cloud-side virtual network, the particular MNSG the customer wishes to use, the label(s) used for the routing information exchanged for the ENS and the data packets transferred for the ENS, performance requirements for the ENS, availability requirements, and the like. In order to simplify the user experience of the customers, in at least some embodiments, one or more sets of templates 465 for ENS establishment/configuration may be created and stored in metadata repository 460. A given template may be the equivalent of a form which can be accessed via programmatic interfaces 472, filled out with specific configuration information pertaining to each new ENS the customer wishes to set up, and submitted to the SGS by the customer. Upon receiving a filled-out template via the programmatic interfaces, a CPN 451 may establish the new ENS by performing the required configuration tasks.

In one embodiment, different customers of an SGS may create (or request creation by the SGS control plane of) custom templates for different types of ENSs. For example, a given telecommunication service provider (TSP) may establish ENSs of a first category (category A) for handling traffic of a first subset of the TSP's own customers, and ENSs of a different category (category B) for a second subset of the TSP's customers. Category A ENSs may differ from category B ENSs, for example, in performance requirements for data packets, tenancy (single-tenancy versus multi-tenancy) preferences for the MNSG used, the region or country in which the ENSs are set up (which may have region-specific or country-specific regulatory requirements), and so on. In such a scenario, respective ENS establishment templates may be created for each category of ENS s that the customer wishes to set up, and stored in the metadata repository at the request of the customer. In some cases, the SGS control plane may be requested by a customer to create the custom templates—e.g., the customer may provide an indication of an ENS that has already been set up, and request that a template for setting up such an ENS be created and stored. In other cases, the customer may use the programmatic interfaces 472 to submit a custom template, and then later fill out the custom template when additional ENSs are to be set up. Using such templates may streamline the workflow for creating ENSs, reducing the number of steps required to be performed by the customers in various embodiments.

In some embodiments, a DPN fleet of an SGS may not comprise multiple fleets of the kind shown in FIG. 4. Instead of using DMNs as intermediaries to direct data plane traffic to the appropriate FLINs assigned to particular ESNs, the FLINs may be configured to receive data packets themselves (e.g., from customer premises and/or from endpoints within the cloud-side virtual networks) in such embodiments. Such FLINs may examine and extract the labels of the data packets to determine the particular ESNs to which the data packets belong, and perform the needed encapsulation/forwarding tasks accordingly.

Figure 5:
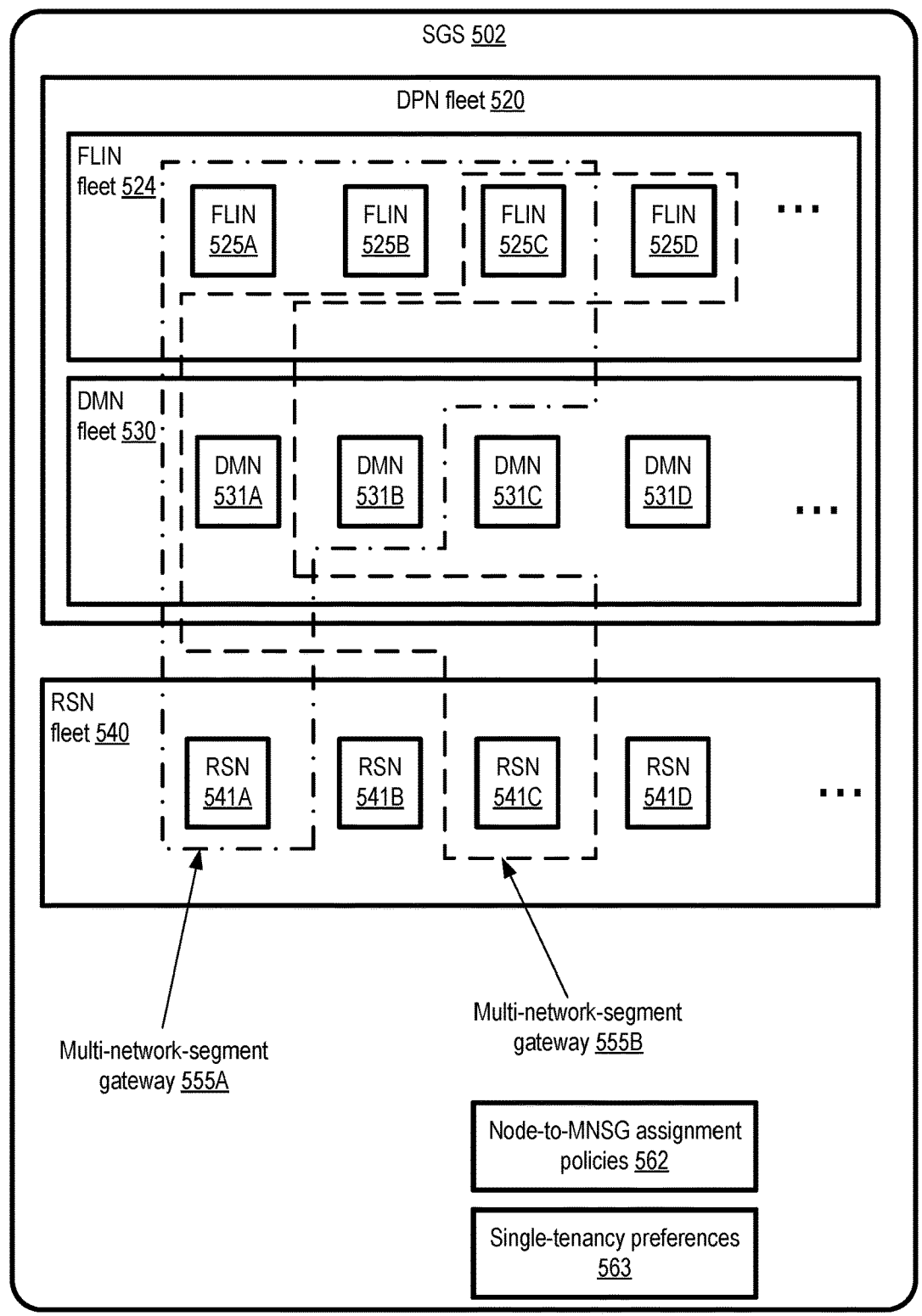
FIG. 5 illustrates an example scenario in which nodes of at least some layers of a gateway service may be configured in a multi-tenant mode, according to at least some embodiments.

FIG. 5 illustrates an example scenario in which nodes of at least some layers of a gateway service may be configured in a multi-tenant mode, according to at least some embodiments. A DPN fleet 520 of SGS 502 may comprise FLINs 525A, 525B, 525C and 525D of FLIN fleet 524 in the depicted embodiment. DMN fleet 530 may comprise DMNs 531A, 531B, 531C and 531D. RSN fleet 540 may include RSNs 541A, 541B, 541C and 541D.

In response to one or more programmatic requests to configure or create an MNSG for a customer of the SGS 502, a control plane node of the SGS (not shown in FIG. 5) may select one or more nodes of the three fleets, and assign the selected nodes to the MNSG in the depicted embodiment. For example, MNSG 555A may comprise RSN 541A, DMN 531A and 531B, and FLINs 525A, 525B and 525C at a point of time represented in FIG. 5, while MNSG 555B may comprise RSN 541C, DMN 531A, FLIN 525C and 525D. The number of nodes of each fleet which are assigned to a given MNSG may be chosen by the control plane node based on any combination of various factors in different embodiments, such as the rate at which data packets are expected to be transmitted by that MNSG, the number of ENS s expected to be supported by that MNSG, the geographical distribution of the sources of the data packets, the kinds of devices from which the data of the data packets is expected to originate (e.g., cell phones versus IoT devices), the resource utilization levels (e.g., CPU utilization, memory utilization, etc.) of the set of nodes available at each layer during a recent time interval relative to the time at which the assignment decision is made, preferences for a minimum/maximum number of nodes of each type indicated by the customer on whose behalf the MNSG is being configured, single-tenancy preferences 563 (if any such preferences are provided by the customer) and so on. At least some of these factors may be indicated via programmatic interfaces of the SGS in various embodiments, while some other factors (such as resource utilization levels, geographical location of the available nodes, etc.) may be determined internally at the SGS without customer input.

The SGS may implement a set of node-to-MNSG assignment policies 562 in the depicted embodiment when making its node assignment decisions. For example, a default policy may indicate that (a) a single RSN should be assigned to an MNSG in single-tenant mode, (b) at least two DMNs and at least two FLINs should be assigned to an MNSG, (c) if the recent utilization level (e.g., levels of CPU utilization, memory utilization etc. over a time interval of T minutes before the current time) of a given node of the FLIN fleet is below a threshold, and the customer has not expressed a preference for single tenancy at the FLIN layer, that FLIN, configured in multi-tenant mode, should be used for the customer's MNSG, and (d) if the recent utilization level of a given node of the DMN fleet is below a threshold, and the customer has not expressed a preference for single tenancy at the DMN layer, that DMN, configured in multi-tenant mode, should be used for the customer's MNSG. In the example scenario shown in FIG. 5, DMN 531A is configured in multi-tenant mode and used for both MNSG 555A and MNSG 555B. Similarly FLIN 525C is configured in multi-tenant mode and also used for both MNSGs. Customers may propose their own customized node-to-MNSG assignment policies via programmatic interfaces to the SGS in some embodiments. The proposed policies may be analyzed by the SGS control plane nodes, and if a determination is made that the policies are acceptable and can be implemented, they may be adopted for the MNSGs of that customer. Single-tenancy preferences 563 may be specified programmatically by the customers for individual fleets (other than the CPN fleet) or for all the fleets (other than the CPN fleet) in some embodiments, requesting that nodes of the specified fleets that are utilized for the customers' MNSGs not be shared with other customers. In at least some embodiments, the node-to-MNSG assignment policies (the default policy and/or custom policies) may indicate rules to be used to determine when the number of nodes at any of the layers should be increased or decreased—e.g., by default, for every N packets/second of aggregated data plane packet arrivals, at least one FLIN may be configured, so additional FLINs may be added to the MNSG as the arrival rate increases. Other combinations of parameters and/or rules may be indicated in the policies in some embodiments.

Figure 6:
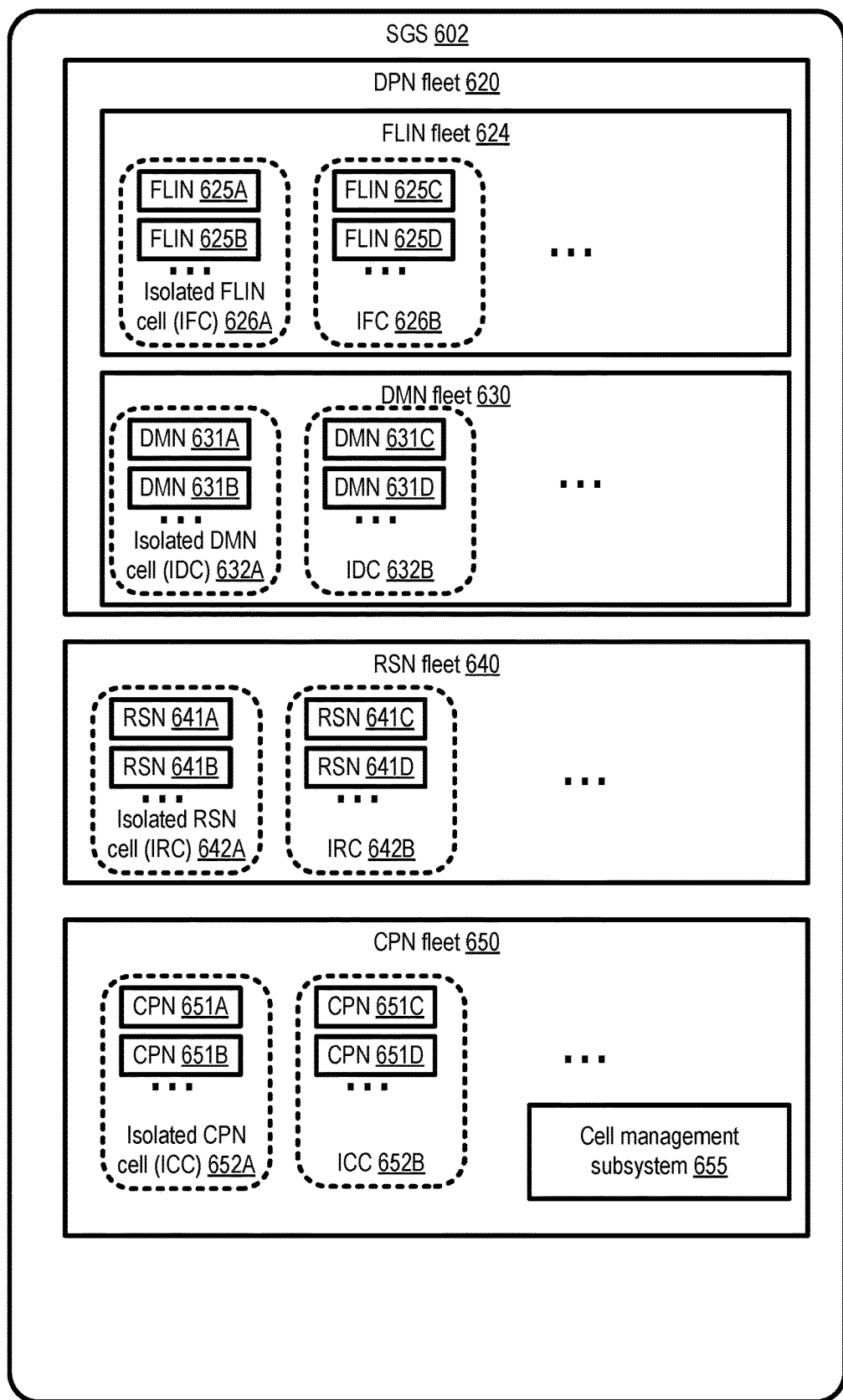
FIG. 6 illustrates an example scenario in which at least some layers of a gateway service may be configured as a collection of isolated cells, according to at least some embodiments.

FIG. 6 illustrates an example scenario in which at least some layers of a gateway service may be configured as a collection of isolated cells, according to at least some embodiments. A given isolated cell can include some number (e.g., at least a pre-selected minimum, and up to a pre-selected maximum number, where the minimum and maximum are chosen by the control plane nodes) of nodes assigned to fulfill a subset of the workload of the corresponding fleet, and nodes of the cells may be assigned to MNSGs in such a way as to minimize or avoid communications across cell boundaries in various embodiments.

In the depicted embodiment, FLIN fleet 624 of DPN fleet 620 of an SGS 602 may comprise a plurality of isolated FLIN cells (IFCs) such as IFC 626A and IFC 626B. IFC 626A may comprise FLIN 625A and FLIN 625B, while IFC 626B may include FLIN 625C and 625C. DMN fleet 630 may comprise isolated DMN cell (IDC) 632A and IDC 632B, with IDC 632A comprising DMNs 631A and 631B, and IDC 632B comprising DMNs 631C and 631D. RSN fleet 640 may include isolated RSN cell (IRC) 642A and IRC 642B. IRC 642A may in turn comprise RSN 641A and RSN 641B, while IRC 642B may include RSN 641C and RSN 641D. The CPN fleet 650 of the SGS may also be organized as a collection of isolated cells, including isolated CPN cell (ICC) 652A and ICC 652B. ICC 652A may comprise CPN 651A and CPN 651B, while ICC 652B may include CPN 651C and CPN 651D. The CPN fleet 650 may include some CPNs assigned to a cell management subsystem 655, responsible for creating cells at the different fleets when needed, deleting cells, expanding cells by adding additional nodes, and so on.

Network-accessible services, such as the SGS 602, that are implemented using such cells may be referred to as cell-based services, cell-oriented services or cellularized services. The workload of a given cell-based service may be divided into subsets (with each cell being assigned one or more of the subsets) along various dimensions, such as account identifiers of the customers on whose behalf service requests are to be processed, respective partitions or shards of the data being managed at the service on behalf of clients, groups of physical locations or network addresses from which service requests originate, and so on, depending on the nature of the service and the typical patterns of service requests. As indicated above, the cells may be described as being isolated or largely independent of one another because, under normal operating conditions, the service requests corresponding to a particular subset of the workload (e.g., service requests from a group of service request sources to which a given cell has been assigned) may be processed entirely within a single cell, requiring no communications across cells. Furthermore, administrative decisions such as addition of request processing resources to a given cell can be made independently of administrative decisions made with regard to other cells. Because of the subdivision and distribution of the workload, the impact of a failure within any given cell is limited; service customers whose workloads are assigned to other cells of the service remain unaffected by such failures. In at least some embodiments, the cell-based approach may be used for some but not all the layers of the SGS. The cells of a given layer (e.g., the FLIN layer, the DMN layer or the RSN layer) may have a different minimum or maximum node count than the cells of other layers in some embodiments. In some embodiments, a given cell may comprise nodes of more than one layer—e.g., a given cell may include both FLINs and DMNs, with a minimum number of FLINs, a minimum number of DMNs, a maximum number of FLINs and a maximum number of DMNs being chosen for the cells by the SGS control plane nodes.

Figure 7:
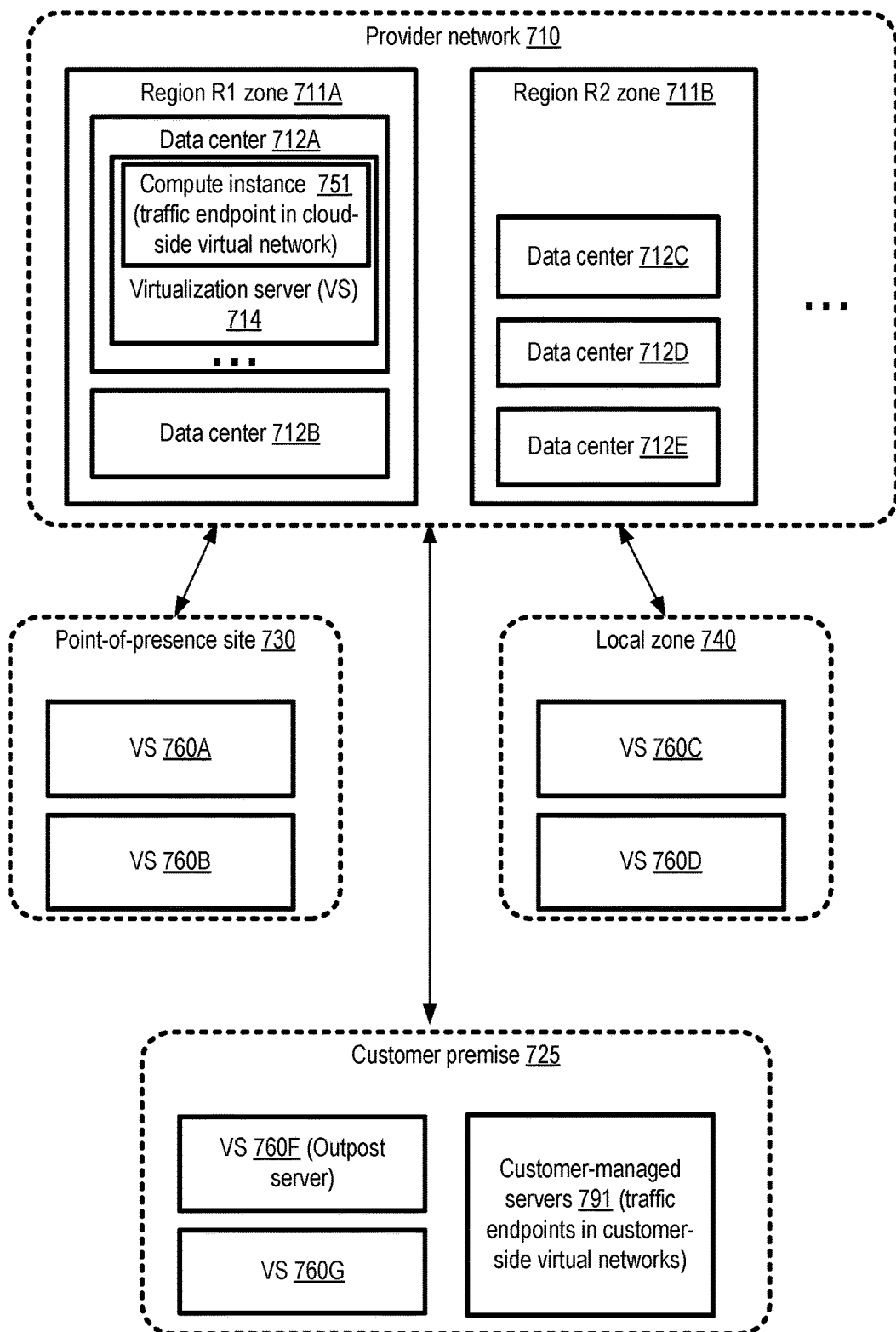
FIG. 7 illustrates example types of sites at which provider network computing resources may be utilized in combination with customer-premise computing resources to establish end-to-end network segments, according to at least some embodiments.

FIG. 7 illustrates example types of sites at which provider network computing resources may be utilized in combination with customer-premise computing resources to establish end-to-end network segments, according to at least some embodiments. In the embodiment depicted in FIG. 7, resources of a provider network 710 may be organized into regional zones, such as region R1 zone 711A and region R2 zone 711B. A given regional zone may in turn comprise one or more data centers located relatively close to each other (e.g., within the same state or metropolitan area). Region R1 zone 711A comprises data centers 712A and 712B, while region R2 zone 711B comprises data centers 712C, 712D and 712E in the example shown in FIG. 7. Each such data center 712 may comprise control plane servers and data plane resources and artifacts of one or more services such as an SGS similar to SGS 402 of FIG. 4, a VCS, and the like.

The data centers 712 may each comprise a set of virtualization servers (VSs) 714, at which compute instances such as compute instance 751 may be launched at the request of provider network customers, and utilized as traffic endpoints within cloud-side virtual networks of ENSs in the depicted embodiment. Compute instances may also be established and utilized for applications run within cloud-side virtual networks at virtualization servers at several other kinds of facilities or sites in various embodiments. Such sites may include, among others, customer premises 725 such as local data centers, local zones 740, and/or point-of-presence sites 730 in different embodiments. As shown, VSs 760A and 760B may be set up at point-of-presence site 730. VSs 760C and 760D may be set up at local zone 740, and VSs 760F and 760G may be set up at a customer premise 725. In some embodiments, for telecommunication service providers such as the TSPs discussed in the context of FIG. 2, VSs may be set up at a cell site (e.g., a room or group of rooms located next to cell towers with antennas). At various customer premises, customer-managed servers 791 may be configured as traffic endpoints in customer-side virtual networks which form part of ENSs of the kind discussed earlier. Other types of facilities and locations may be used for VSs of cloud-side virtual networks in some embodiments, instead or in addition to those shown in FIG. 7.

Figure 8:
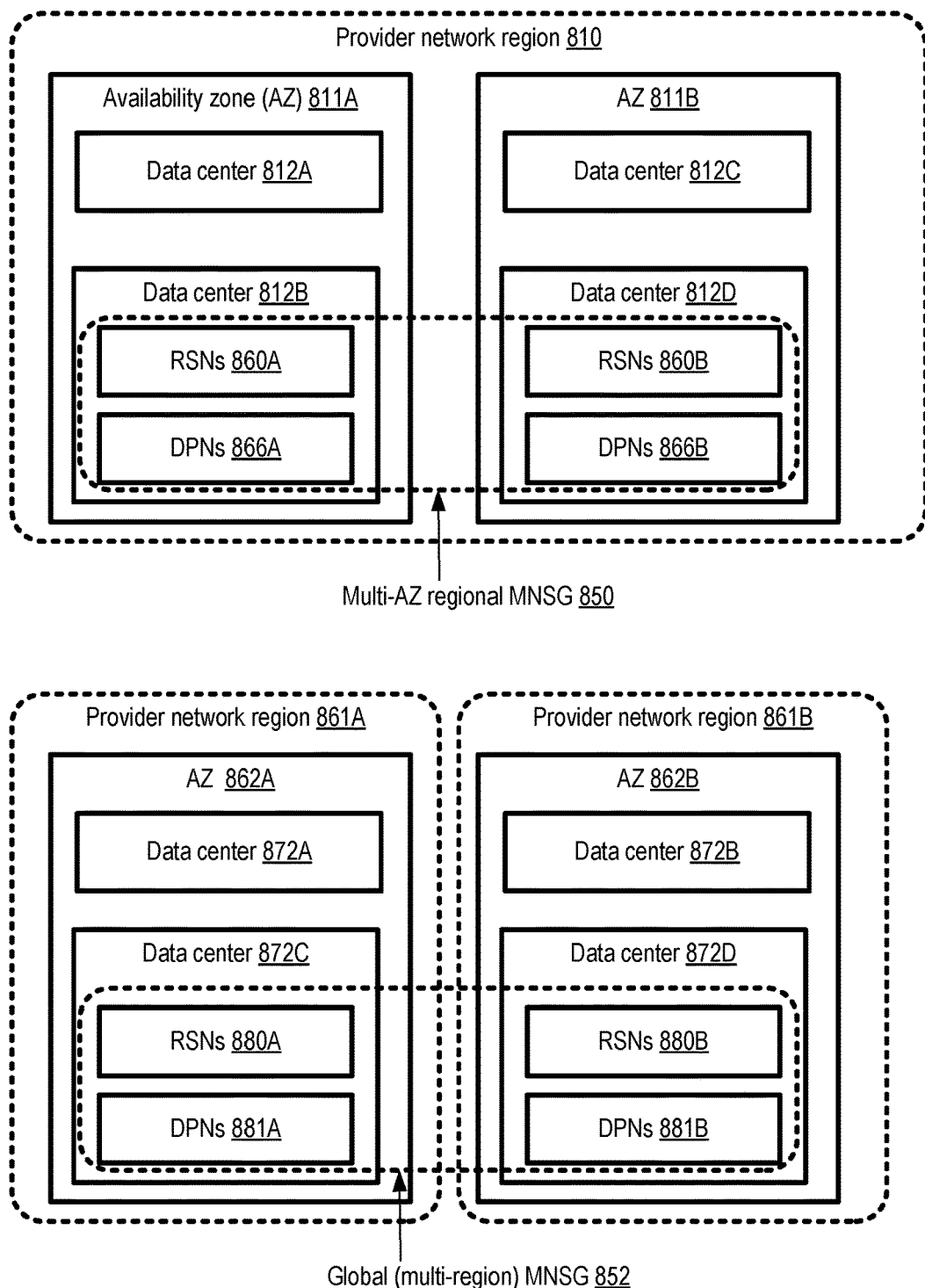
FIG. 8 illustrates example regional and global multi-network-segment gateways which may be established at a provider network, according to at least some embodiments.

FIG. 8 illustrates example regional and global multi-network-segment gateways which may be established at a provider network, according to at least some embodiments. In some embodiments, for example to increase the resilience of applications that utilize ENSs to various types of failures, a multi-AZ regional MNSG 850 may be configured for an SGS customer. Provider network region 810 may comprise availability zones (AZs) 811A and 811B in the depicted embodiment, with AZ 811A comprising data centers 812A and 812B, and AZ 811B comprising data centers 812C and 812D. The multi-AZ regional MNSG 850 may comprise RSNs and DPNs in both AZs (RSNs 860A and DPNs 866A within AZ 811A, and RSNs 860B and DPNs 866B within AZ 811B) in the depicted embodiment, so that the applications can continue to function in the unlikely event of a failure that affects all the RSNs or DPNs within a given AZ. Routing information and IVN mappings that can be used to route the traffic of the ENSs being managed with the help of MNSG 850 may be replicated or propagated to the DPNs in both AZs in the embodiment shown in FIG. 8, and an RSN in one AZ may be configured to fail over to an RSN in the second AZ if needed. In some embodiments, a given customer-side routing information source may establish communication sessions with RSNs in more than one AZ and replicate the routing information it is sending to the MNSG in both sessions. While FIG. 8 shows a multi-AZ regional MNSG that includes resources in two AZs, in various embodiments multi-AZ MNSGs may use resources within more than two AZs if desired.

In some embodiments, MNSGs may be implemented as global entities, such that a given MNSG can be utilized to set up ENSs within multiple regions of the provider network. Global (multi-region) MNSG 852 may be set up using resources within provider network regions 861A and 861B in the embodiment depicted in FIG. 8. MNSG 852 comprises RSNs 880A and DPNs 881A at data center 872C of AZ 862A (which also includes data center 872A) within region 861A, and also comprises RSNs 880B and DPNs 881B at data center 872D of AZ 862B (which also includes data center 872B) within region 861A. In various embodiments, global MNSGs may include resources within more than two provider network regions. Global MNSGs may be especially useful for SGS customers whose operations span multiple countries or even continents, as the customers may be able to set up ENSs in all the locations without having to set up multiple gateways.

Compute instances set up within IVNs of the VCS (and utilized for ENSs of the kind described earlier) may be assigned IP addresses from address ranges selected by the VCS customers for their IVNs. A given compute instance with an IVN IP address Addr1 may run at a virtualization server configured which is assigned a different address Addr2 within the physical network (also referred to as a substrate network) of the VCS. In order to deliver packets whose source or destination IP addresses lie within such IVN address ranges, mappings between the compute instances' addresses and the substrate network addresses of the VSs may be used, and the packets to/from the IVN addresses may be encapsulated in various embodiments, e.g., by DPNs of the MNSGs.

Figure 9:
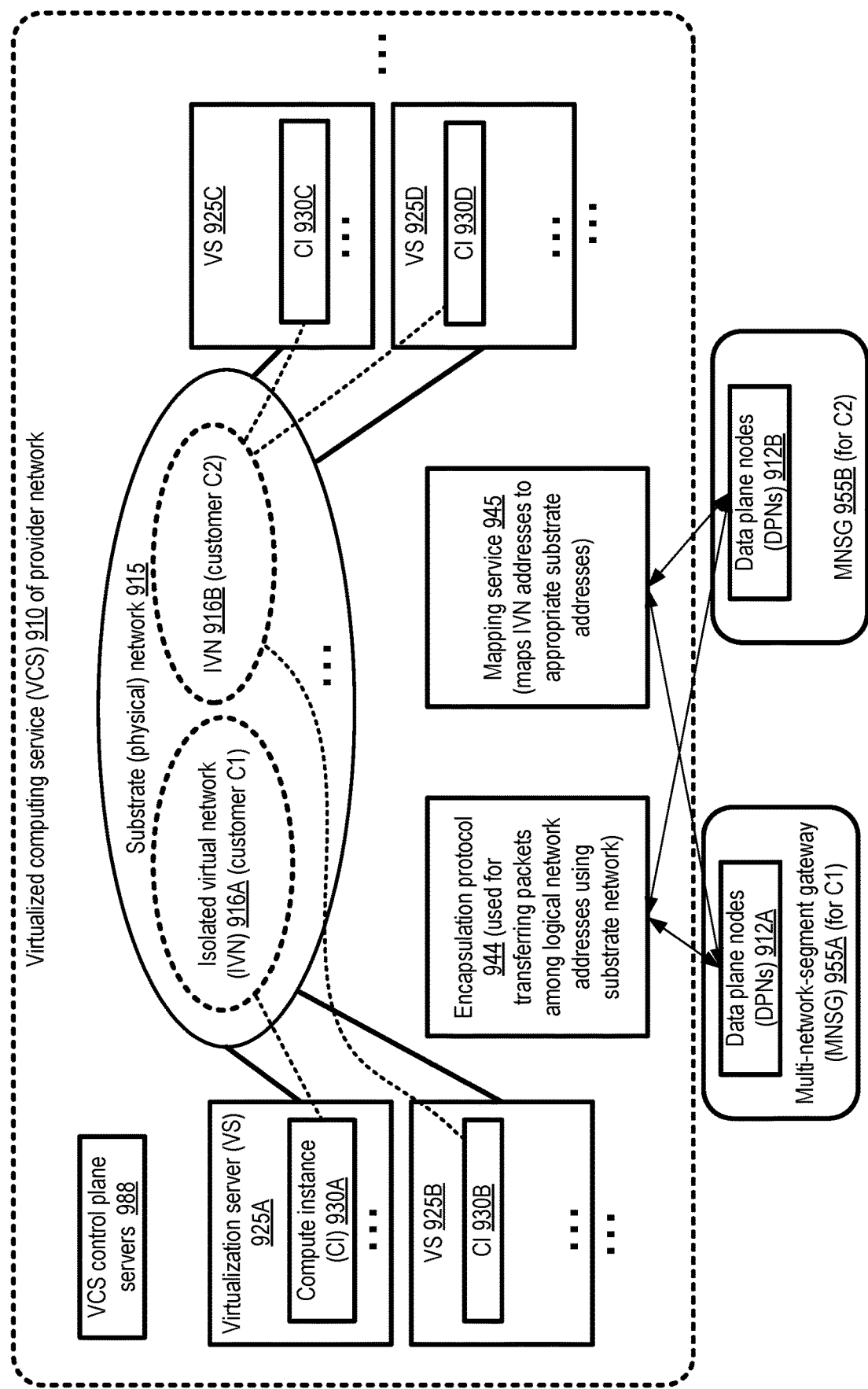
FIG. 9 illustrates an example scenario in which data plane nodes of multi-network-segment gateways may implement an encapsulation protocol of a virtualized computing service of a cloud provider network, according to at least some embodiments.

FIG. 9 illustrates an example scenario in which data plane nodes of multi-network-segment gateways may implement an encapsulation protocol of a virtualized computing service of a cloud provider network, according to at least some embodiments. VCS 910 of a provider network may comprise a substrate (physical) network 915, to which VSs 925 may be connected, e.g., via respective physical network interface cards (NICs) in the depicted embodiment. In some implementations the VSs may each be connected to the substrate network via one or more Ethernet or similar cables linked to a top-of-rack switch configured within the substrate network. Using the substrate network 915 as the physical infrastructure, a set of isolated virtual networks (IVNs) may be configured by VCS control plane servers 988, such as IVN 916A set up for customer C1 of the provider network, or IVN 916B set up for customer C2. Compute instances (CIs) 930 (e.g., CI 930A, 930B, 930C, or 930D) may be assigned network addresses within the IVNs in at least some embodiments. Thus, for example, CI 930A of VS 925A may be configured within IVN 916A, while CI 930B of VS 925B, CI 930C of VS 925C and CS 930D of VS 925D may be configured within IVN 916B. In some implementations, respective virtual network interfaces (VNIs) may be created by the VCS and programmatically attached to the CIs, and each such VNI may be assigned one or more private IP addresses (addresses that by default may not be accessible from outside the IVN) from a range of addresses selected for the corresponding IVN. Address ranges used within IVNs for private addresses assigned to the CIs may overlap with one another. For example, CIs 930A and 930B may both be assigned the same private IP address, and this would not cause any problems because CI 930A is configured within a different IVN than CI 930B. To manage and route the network traffic directed to or from entities (such as CIs 930) of the IVNs using the underlying substrate network to which the virtualization servers are connected, a mapping service 945 and/or an encapsulation protocol 944 may be employed in the depicted embodiment by DPNs 912A of MNSG 955A set up on behalf of customer C1, and by DPNs 912B of MNSG 955B set up on behalf of customer C2.

Encapsulation protocol 944 (which is used to envelop or encapsulate packets associated with logical network sources/destinations within larger "augmented" packets associated with substrate network sources/destinations) and an associated mapping service 945 of the VCS may be used to accomplish packet transfers to/from CIs in the depicted embodiment. DPNs 912A and 912B may implement the encapsulation and de-capsulation operations of the protocol, and utilize the mapping service 945 to determine the specific substrate address to which a given packet (e.g., a packet containing data generated at a customer-side virtual network) should be sent. At the receiving end of a flow of packets being sent to a CI, a networking virtualization manager (NVM) running at the VS at which the CI runs may extract (de-capsulate) the original packet from the encapsulation packet, and provide it to the destination CI. In some embodiments, to ensure that the packet is from a trusted/valid source, the NVM may consult the mapping service to perform a reverse mapping (e.g., to identify the origin of the packet) before extracting the original packet. The mapping service 945 may thus provide security by preventing the opening of packets that are not validated. In embodiments in which the DPNs are also run at CIs, for packets being transmitted in the reverse direction, the NVMs at the VS s within the IVNs may consult the mapping service to obtain the right substrate address for the DPN node, and perform the required encapsulation operation.

Figure 10:
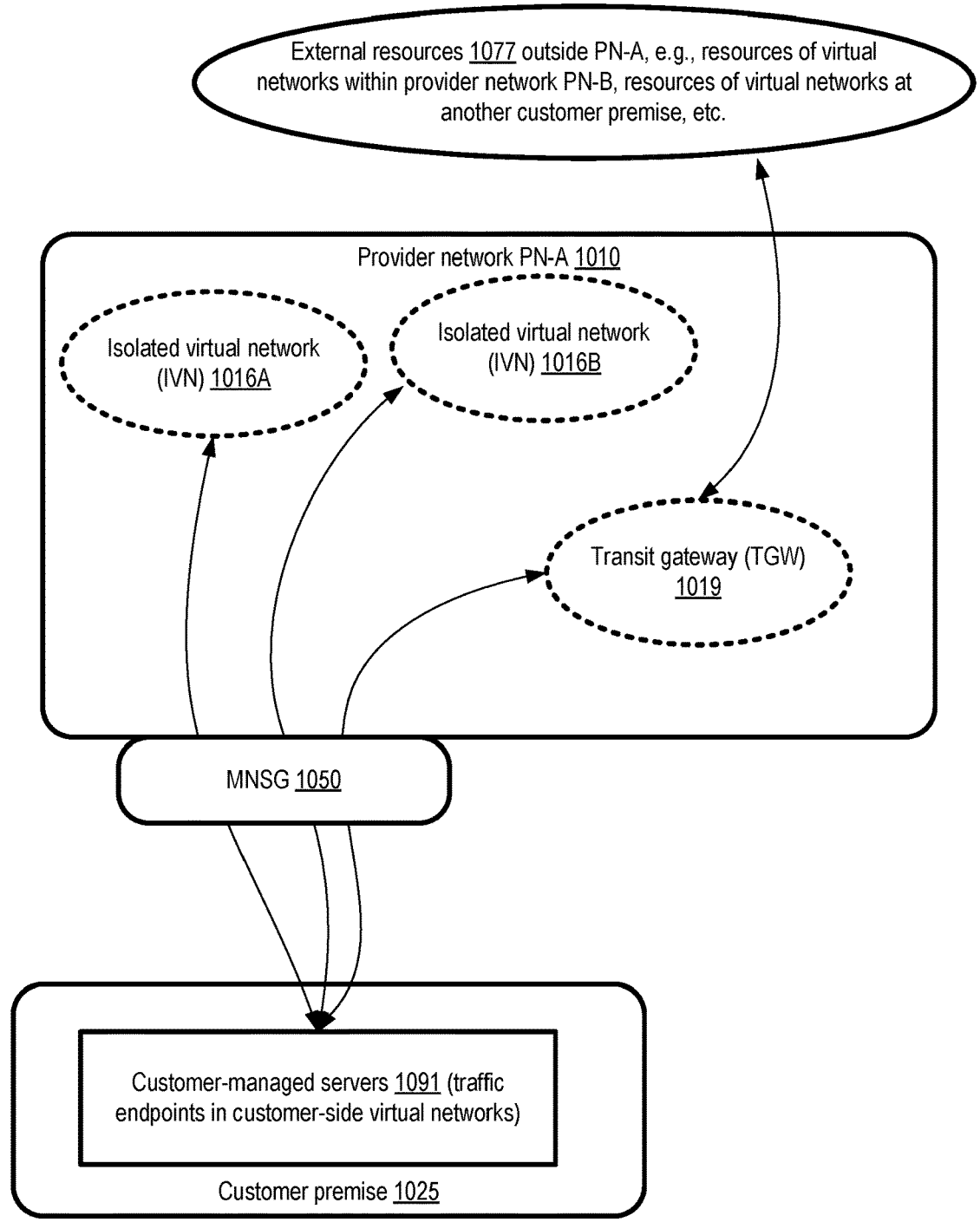
FIG. 10 illustrates an example scenario in which a multi-network-segment gateway may transmit some packets to endpoints external to a provider network region via transit gateways of the provider network, according to at least some embodiments.

FIG. 10 illustrates an example scenario in which a multi-network-segment gateway may transmit some packets to endpoints external to a provider network region via transit gateways of the provider network, according to at least some embodiments. In the embodiment depicted in FIG. 10, a provider network PN-A 1010 may comprise various IVNs set up on behalf of customers. For example, IVN 1016A and IVN 1016B may be established to implement portions of respective applications of a customer, with other portions of the same applications being implemented at customer premise 1025 using a set of customer-managed servers 1091 which are configured at traffic endpoints within customer-side virtual networks. A given cloud-side virtual network within PN-A, such as IVN 1016A or IVN 1016B, may be combined with a respective customer-side virtual network at premise 1025 to form an ENS with the help of an MNSG 1050 set up on behalf of the customer by an SGS of PN-A.

For some types of applications of the customer, a portion of the application functionality may be implemented using resources outside PN-A 1010, referred to as external resources 1077 in FIG. 10. Such resources may, for example, be servers configured within virtual networks at a different provider network PN-B (operated by an entity other than the operator of PN-A), servers set up within a virtual network at a different premise of the same customer or a different customer of the provider network PN-A, and so on. The customer may wish to also utilize MNSG 1050 for ENS s which include some resources at customer premise 1025, and a subset of external resources 1077 in the depicted embodiment. In order to accomplish this, a transit gateway (TGW) 1019 may be set up within PN-A, with connectivity established between MNSG 1050 and the TGW, and connectivity also established between the TGW and the external resources 1077. TGWs may also be referred to as virtual traffic hubs, as they may be used as hubs that route traffic between a variety of different types of networks ("spoke" networks) in a hub-and-spoke architecture according to routing policies specified by provider network customers. The TGW 1019 may transmit packets between resources of PN-A and resources external to PN-A, sending packets for example via virtual private network (VPN) tunnels, dedicated direct connect links and the like in the depicted embodiment. In some embodiments, TGWs may be used for traffic between IVNs of the provider network PN-A, and not just for traffic that flows to destinations (or flows from source) external to PN-A.

The DPNs of the MNSG 1050 may be provided configuration information, e.g., by control plane nodes of the SGS or the VCS, indicating that packets directed to external resources 1077 should be sent via the TGW in the depicted embodiment, and the TGW may be provided configuration information indicating that packets directed to the customer premise 1025 from the external resources should be sent via the MNSG. Using TGWs or other similar intermediaries along with MNSGs, ENSs comprising resources in a variety of locations and/or numerous provider networks may be set up and managed on behalf of customers of the provider network at which the MNSGs are established. In at least some embodiments, the same SGS which is used to establish MNSGs such as MNSG 1050 may also be used to establish TGWs 1019—e.g., TGWs and MNSGs may both be implemented using software-defined networking techniques.

In some embodiments, respective sets of route tables may be maintained for traffic associated with various ENSs set up using an MNSG. For each ENS, the MNSG may cause route table entries to be added to (or modified in) a respective set of route tables. In some embodiments, the route tables may be stored as part of the configuration metadata of the MNSG itself; in other embodiments, the route tables may be stored at other networking devices (such as routers) of the provider network, and the MNSG may send information to update the route tables to such devices when needed. In various embodiments, the number of route tables that are to be set up for a given ENS may be selected by the customer on whose behalf the ENS and the MNSG is established; customers may, for example, wish to distribute routing entries among multiple route tables of a given ENS for administrative reasons. When the RSN of the MNSG receives routing updates, e.g., from the customer-side routing information source and/or from the VCS control plane, routing table entries may be added to (or removed from) the route tables by the RSN.

Figure 11:
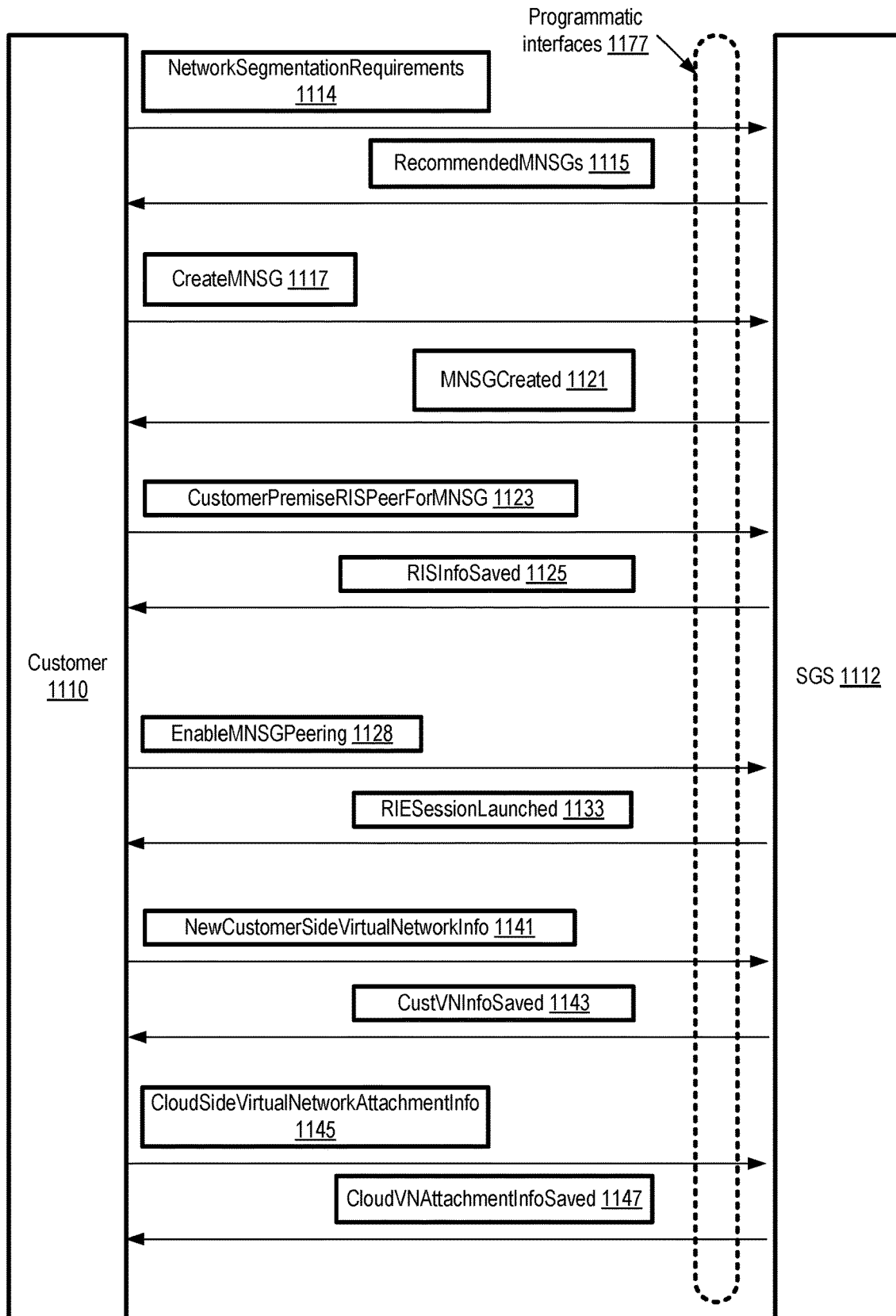
FIG. 11 and FIG. 12 collectively illustrate example programmatic interactions between customers and a gateway service of a cloud provider network, according to at least some embodiments.
Figure 12:
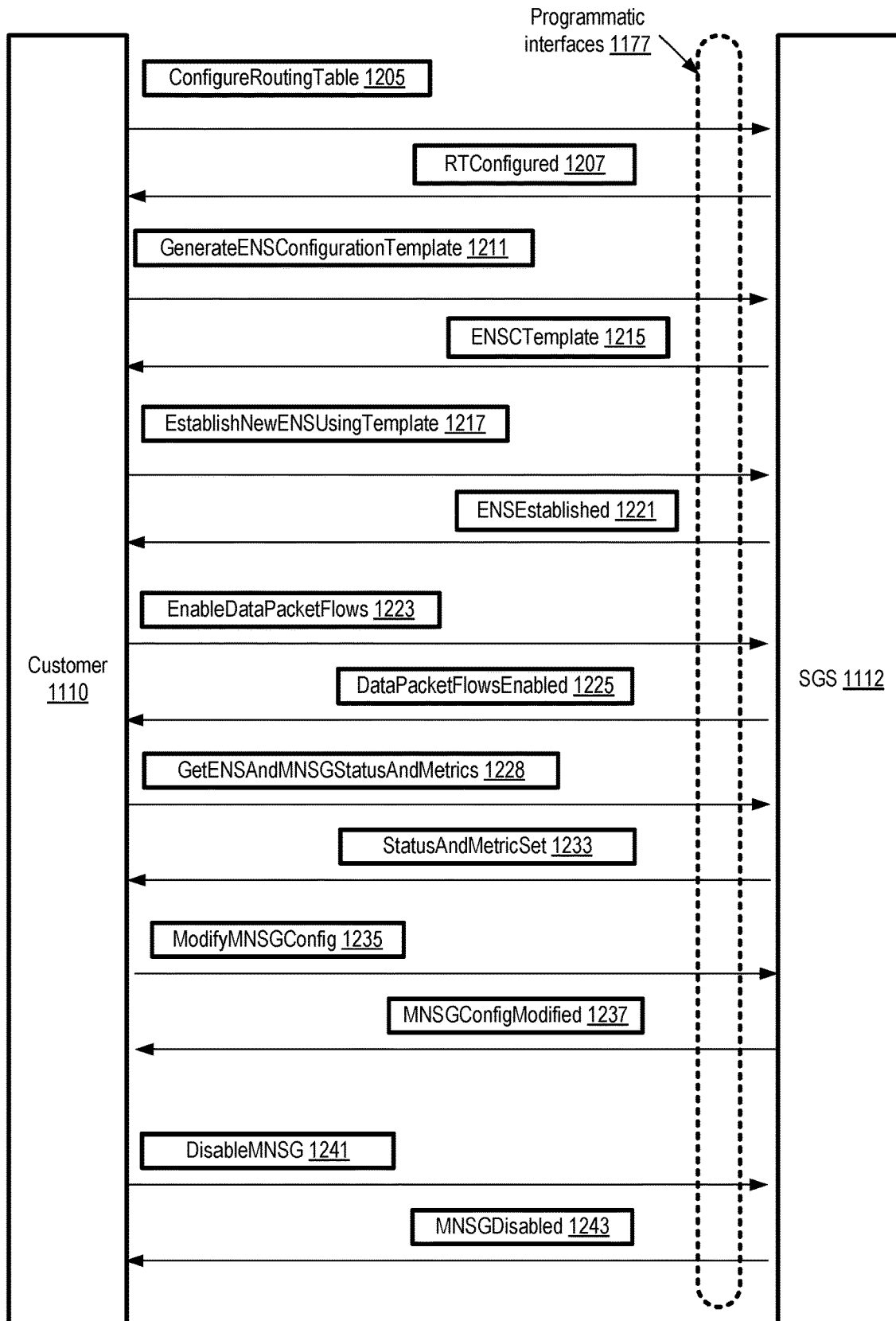

FIG. 11 and FIG. 12 collectively illustrate example programmatic interactions between customers and a gateway service of a cloud provider network, according to at least some embodiments. An SGS 1112 may implement a set of programmatic interfaces 1177, comprising for example include APIs, command-line tools, graphical user interfaces, web-based consoles and the like that can be used by customers to request various types of tasks associated with setting up and managing ENSs. A client or customer 1110 of the SGS may use the programmatic interfaces to submit a NetworkSegmentationRequirements message 1114 to the SGS in some embodiments, comprising a descriptor of the customer's anticipated requirements for ENSs. The descriptor may, for example, indicate the approximate number of ENSs the customer currently plans to establish over some time period, the location(s) of the customer premise(s) at which the customer-side virtual networks are expected to be set up, the kind of routing information exchange protocol and data plane protocol the customer wishes to use, performance requirements of the ENSs, availability requirements of the ENSs, single-tenancy requirements if any of the customer, and so on. In response to the NetworkSegmentationRequirements message 1114, the SGS control plane may generate a recommended MNSG configuration for the customer, indicating for example the number of MNSGs that should preferably be set up to meet the requirements, the kinds of MNSGs (e.g., regional or global) that should be set up, and so on. The recommendation configuration may be sent to the customer via one or more RecommendedMNSGs messages 1115 in the depicted embodiment.

In some embodiments, a customer 1110 may submit one or more CreateMNSG requests 1117 to the SGS 1112 to request establishment of an MNSG. Metadata objects representing the MNSG may be generated and stored at the SGS, and an MNSGCreated message 1121 may be sent to the customer in various embodiments. In some cases, the CreateMNSG request may indicate a recommendation that the SGS has provided (e.g., via a RecommendedMNSGs message), and request that the recommendation be implemented. In other cases, the customer may not refer to any recommendations in the CreateMNSG request, e.g., wither because the customer had not requested a recommendation earlier, or because the customer did not wish to implement a recommendation generated by the SGS. The CreateMNSG request may indicate various desired properties of the MNSG which is to be set up, such as single-tenancy (either at all layers of the MNSG, or at some specified subset of layers such as the RSN layer, the DMN layer or the FLIN layer), performance requirements (for routing information exchange, and/or for data packets), availability requirements, protocols to be used for routing information and for data packets, and so on. In at least some embodiments, an initial set of one or more RSNs and one or more DPNs may be assigned to the newly-created MNSG, and an indication of these assignments may be included in the metadata representing the MNSG.

After the MNSG has been created, in some embodiments, the customer may provide information about the customer-side routing information source (RIS) with which the MNSG is to exchange routing information. A CustomerPremiseRISPeerForMNSG message 1123 may be used to inform the SGS about the RIS, e.g., including a network address of the RIS, the name and version number of the routing information exchange information protocol to be used, authorization credentials (or, more generally, an authorization algorithm) to be used to establish a routing information exchange session, autonomous system (AS) identifiers to be used for the session, and so on. The information about the RIS may be stored at the SGS, and an RISInfoSaved message 1125 may be sent to the customer in some embodiments.

To initiate establishment of the routing information exchange session, a customer may submit an EnableMNSGPeering request 1128 to the SGS 1112 in some embodiments. The RSN of the MNSG specified in the peering message may then establish connectivity with the customer-premise RIS using the identification information that was provided via the CustomerPremiseRISPeerForMNSG message earlier. If the session is established successfully, an RIESessionLaunched message 1133 may be sent to the client in the depicted embodiment. In some embodiments, one or more parameters governing the exchange of routing information in the session, such as the network address of the RIS, the version or variant of the protocol to be used, the authorization credentials or authorization algorithm to be used, the autonomous systems to be used, etc., may be included in the EnableMNSGPeering message instead of or in addition to being included in the CustomerPremiseRISPeerForMNSG message.

In various embodiments, as and when new customer-side virtual networks whose traffic is to be handled using an MNSG are created or configured, or when new cloud-side virtual networks are created or configured, information about the virtual networks (e.g., associated labels used for routing-related messages and/or for data packets) may be provided to the SGS programmatically by the customer. A NewCustomerSideVirtualNetworkInfo message 1141 may be submitted to inform the SGS about virtual networks established at customer premises, while a CloudSideVirtualNetworkAttachmentInfo message 1145 may be sent to provide information about virtual networks within the provider network which are to be programmatically attached to the MNSG. In response to a NewCustomerSideVirtualNetworkInfo message, the SGS may store the provided data about the customer's virtual network, and send a CustVNInfoSaved message 1143 to the customer. Similarly, in response to a CloudSideVirtualNetworkAttachmentInfo message, the SGS may store the provided data about the cloud-side virtual network, and send a CloudVNAttachmentInfoSaved message 1147 to the customer in the depicted embodiment.

One or more routing tables may be populated with the routing information exchanged between an RSN of an MNSG and the corresponding customer-side routing information source in various embodiments with respect to a given ENS. In at least some embodiments, the routing tables used for the provider network portion of the packet flows may be created and stored at the MNSG, while routing tables used for the customer premise portion of the traffic may be created and stored at the customer-side routing information source or elsewhere within the customer premise network. As shown in FIG. 12, a customer 1110 of the SGS 1112 may submit a ConfigureRoutingTable request 1205 via programmatic interfaces 1177 in some embodiments, e.g., to create a new routing table associated with an MNSG, to add routes to a specified routing table, remove routes from a specified routing table, and so on. In response to the ConfigureRoutingTable request, the SGS may perform the requested configuration tasks, and send an RTConfigured message 1207 back to the customer. A ViewRoutingTables request (not shown in FIG. 11 or FIG. 12) may be submitted by a customer in some embodiments to view one or more routing tables associated within a specified MNSG or a specified ENS.

As mentioned earlier, in some embodiments, templates may be used to simplify the process (from the customer's perspective) of ENS establishment. For example, a single filled-out template submission via programmatic interfaces 1177 may accomplish a combination of configuration tasks which would otherwise have required a workflow comprising a sequence of several different programmatic interactions (e.g., CreateMNSG, CustomerPremiseRISPeerForMNSG, EnableMNSGPeering, etc.). In the embodiment depicted in FIG. 12, a customer may submit a GenerateENSConfigurationTemplate request 1211, requesting the creation of such a template based on a set of programmatic requests/messages that the customer has already sent to the SGS to establish an ENS. For example, if the customer has established an ENS ENS1 using a sequence of API calls API-A, API-B, ..., API-N, the customer may indicate to the SGS that a template which represents that sequence of API calls should be created and made accessible to the customer for establishing new ENS s similar to ENS1. In response, such a template may be created and stored in the metadata of the ENS, and an ENSCTemplate message 1215 may be sent to the customer to indicate the successful creation of the template.

If and when the customer wishes to create a new ENS using such a template, various fields in the template (e.g., identifying the virtual networks to be linked, the MNSG to be used, performance requirements, etc.) may be filled out, and an EstablishNewENSUsingTemplate request 1217 may be submitted. The configuration tasks needed to configure the new ENS may be performed by the SGS control plane, and an ENSEstablished message 1221 may be sent to the customer in the depicted embodiment. In some embodiments, a customer may submit a ViewENSTemplates request (not shown in FIG. 11 or FIG. 12) to obtain a list of templates that can be used by the customer to establish new ENS s. In at least some embodiments, one or more templates for ENS creation may be established by the SGS automatically, without receiving a request from the customer.

After the configuration steps needed for establishing an ENS have been completed, in various embodiments a customer may enable data packets to flow between the virtual networks on the customer side and the cloud side, e.g., by submitting an EnableDataPacketFlows message 1223. In response to an EnableDataPacketFlows request the SGS control plane may send notifications to the DPNs of the ENS's MNSG that forwarding of data packets with the particular label or labels associated with the ENS should be initiated. A DataPacketFlowsEnabled message 1225 may be sent to the client to indicate that the flow of data packets has been enabled. In some embodiments, once an ENS has been set up, data packets may be sent by programs running at either virtual network to the other virtual network without requiring an EnableDataPacketFlows message to be sent.

In various embodiments, the SGS CPNs (and/or other monitoring services within the provider network) may collect a variety of metrics pertaining to MNSGs and ENSs set up for various customers, such as the total number of labeled data packets and labeled routing information packets transmitted in either direction during various time intervals, the utilization levels of the RSNs and DPNs of the MNSG, the number of data packets dropped, the latencies of data packet transmissions, and so on. A customer may submit a GetENSAndMNSGStatusAndMetrics request 1228 to obtain such metrics for specified ENSs and/or specified MNSGs in the depicted embodiment. The requested metrics may be provided via one or more StatusAndMetricSet messages 1233 in the depicted embodiment.

Customers may request modifications of MNSG configurations (e.g., adding/removing route tables, changing target performance levels, etc.) by submitting ModifyNSGConfiguration requests 1235 in some embodiments. The requested changes may be made to the specified MNSGs, and an MNSGConfigModified messages 1237 may be sent to the customer. If and when a customer wishes to disable or de-configure an MNSG, a DisableMNSG request 1241 may be sent, and the SGS control plane may send an MNSG Disabled message 1243 after the specified MNSG has been de-commissioned or deleted from the metadata repository of the SGS. In various embodiments, programmatic interactions other than those shown in FIG. 11 and FIG. 12 for managing and using MNSGs and ENS s may be supported by an SGS 1112. Some of the types of programmatic interactions shown in FIG. 11 or FIG. 12 may not be supported by an SGS in one embodiment. In some embodiments, a consolidated programmatic request or message may be used to accomplish the same tasks as a combination of some of the programmatic requests/messages shown in FIG. 11 and/or FIG. 12 (for example, the CustomerPremiseRISPeerForMNSG and the EnableMNSGPeering messages may be combined into a single message). In other embodiments, multiple programmatic requests may be used to accomplish the tasks corresponding to one of the programmatic requests shown in FIG. 11 or FIG. 12.

Figure 13:
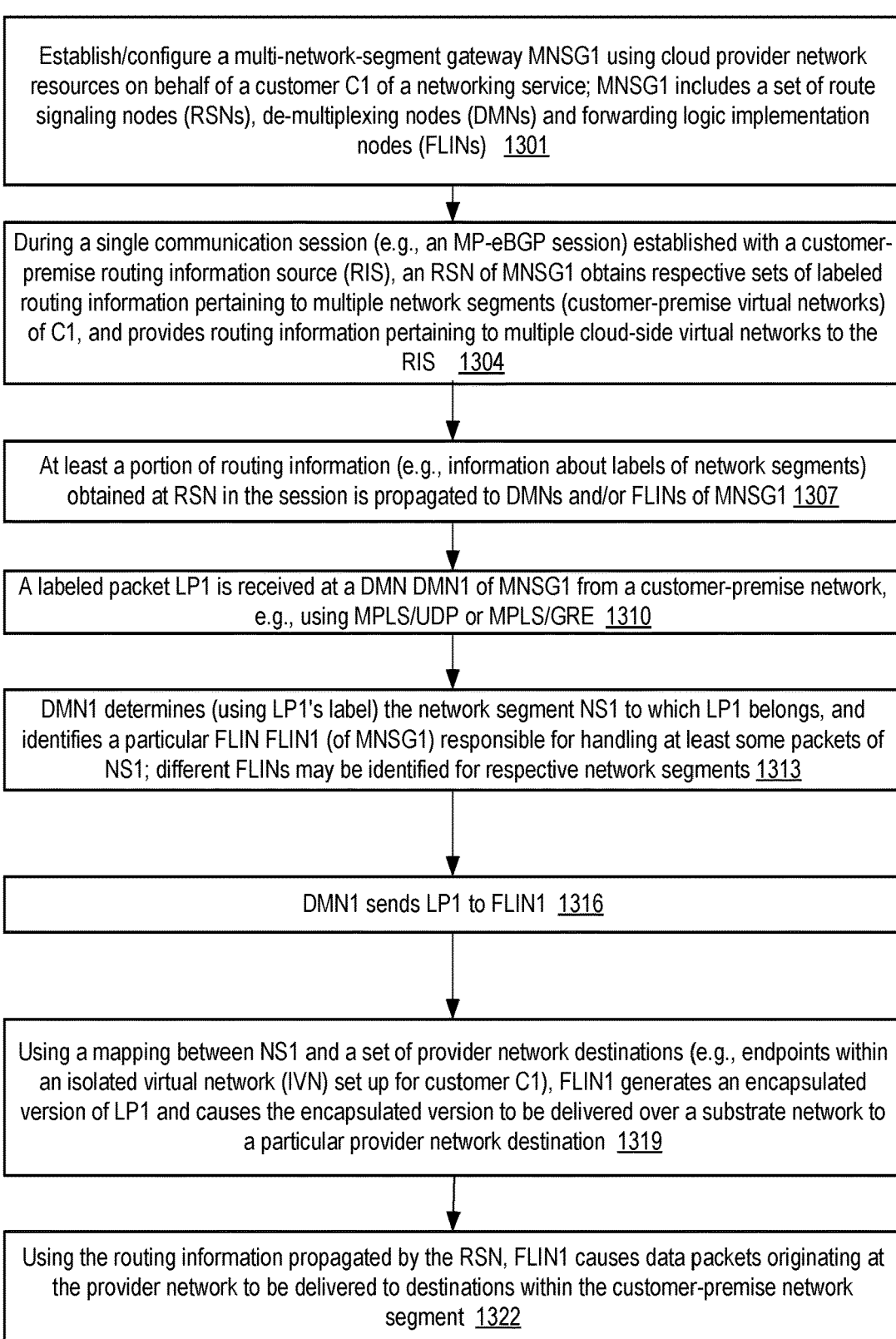
FIG. 13 is a flow diagram illustrating aspects of operations which may be performed at various nodes of a multi-network-segment gateway of a provider network to route packets between virtual networks, according to at least some embodiments.

FIG. 13 is a flow diagram illustrating aspects of operations which may be performed at various nodes of a multi-network-segment gateway of a provider network to route packets between virtual networks, according to at least some embodiments. As shown in element 1301, an MNSG MNSG1 may be established or configured using cloud provider network resources on behalf of a customer C1 of a networking service (such as an SGS) of the provider network. MNSG1 may be assigned a set of RSNs, a set of DMNs and a set of FLINs, e.g., by the control plane of the networking service.

A communication session may be established between an RSN of MNSG1 and a customer premise routing information source (RIS), such as a customer router, in the depicted embodiment. During such a session, which may for example be set up using a variant or version of BGP such as MP-eBGP, respective sets of labeled routing information pertaining to endpoints of a plurality of customer-side network segments (customer-side virtual networks) may be obtained at the RSN (element 1304). Each label may correspond to a respective ENS in some embodiments. A first set of labeled routing information received at the RSN may pertain to a first customer-side network segment whose traffic is to be routed with the help of MNSG1, for example, and a second set of labeled routing information may pertain to a second customer-side network segment whose traffic is also to be routed with the help of MNSG1. In at least some embodiments, the same session may be used to convey labeled routing information pertaining to endpoints within multiple cloud-side virtual networks from the RSN to the RIS.

In various embodiments, at least a portion of the exchanged routing information, including the labels associated with different ENS s, may be propagated to DMNs and/or FLINs by the RSNs (element 1307). In some embodiments, the routing information may be sent directly by the RSNs to the DMNs or the FLINs. In other embodiments, the routing information may be sent to the RSNs and/or the DMNs via intermediaries—e.g., an RSN may send the information to a DMN, and the DMN may send it on to FLINs, or a control plane node may be used as an intermediary. In some embodiments, as soon as a routing update is received at the RSN during the session established with the RIS, the updated routing information may be sent to a DMN and/or a FLIN.

Labeled data packets originating at various endpoints of the virtual networks of an ENS may be received at a DMN of MNSG1. For example, a labeled packet LP1 may be received at a DMN DMN1 from a customer-premise network segment (element 1310). LP1 may be transmitted between the customer-premise network segment and MNSG1 using a version or variant of MPLS, such as baseline MPLS (which may not utilize IP in some implementations), MPLS/UDP or MPLS/GRE in different embodiments. The label of the data packet (which may be the same as the label of the routing information messages received by the RSN, or may differ from the labels used for the routing information messages in some implementations) may indicate the ENS to whose traffic the data packet belongs, and hence the customer-premise network segment and the cloud-side virtual network of the ENS.

DMN1 may determine, using a label of LP1, the particular network segment NS1 or the ENS ENS1 to which LP1 belongs in the depicted embodiment (element 1313). Based at least in part on the label, DMN1 may identify the particular FLIN to which P1 should be sent. For LP1, an FLIN FLIN1 may be chosen by the DMN, e.g., based on a mapping or list obtained at DMN1 from the control plane of the networking service, which indicates which specific FLINs are assigned to handle the traffic received from various customer-premise network segments. For a different labeled data packet LP2, which has a different label, it may be the case that a different FLIN FLIN2 is selected, or it may be the case that the same FLIN FLIN1 may be used.

DMN1 may send LP1 to FLIN1 (element 1316). In at least some implementations, the label may be provided to FLIN1 as well; in other implementations, the label may be stripped from LP1 by the DMN before LP1 is sent to FLIN1.

FLIN1 may utilize a mapping between the network segment to which LP1 belongs, and a set of provider network destinations (endpoints within a cloud-side virtual network such as an IVN set up on behalf of C1) to generate an encapsulated version of LP1 and transmit the encapsulated version over the substrate network of the cloud provider network to a particular provider network destination in the depicted embodiment (element 1319). An encapsulation protocol of the provider network may be used to generate the encapsulated version in various embodiments.

Traffic in the reverse direction (from the cloud to the customer premise) may also be handled using MNSG1 in various embodiments. Using at least a portion of the routing information propagated by the RSN, FLIN1 may cause data packets which originate within the provider network (e.g., an endpoint to which the encapsulated version of LP1 was sent) to be delivered to destinations within the customer-premise network segment NS1 (element 1322), for example.

Figure 14:
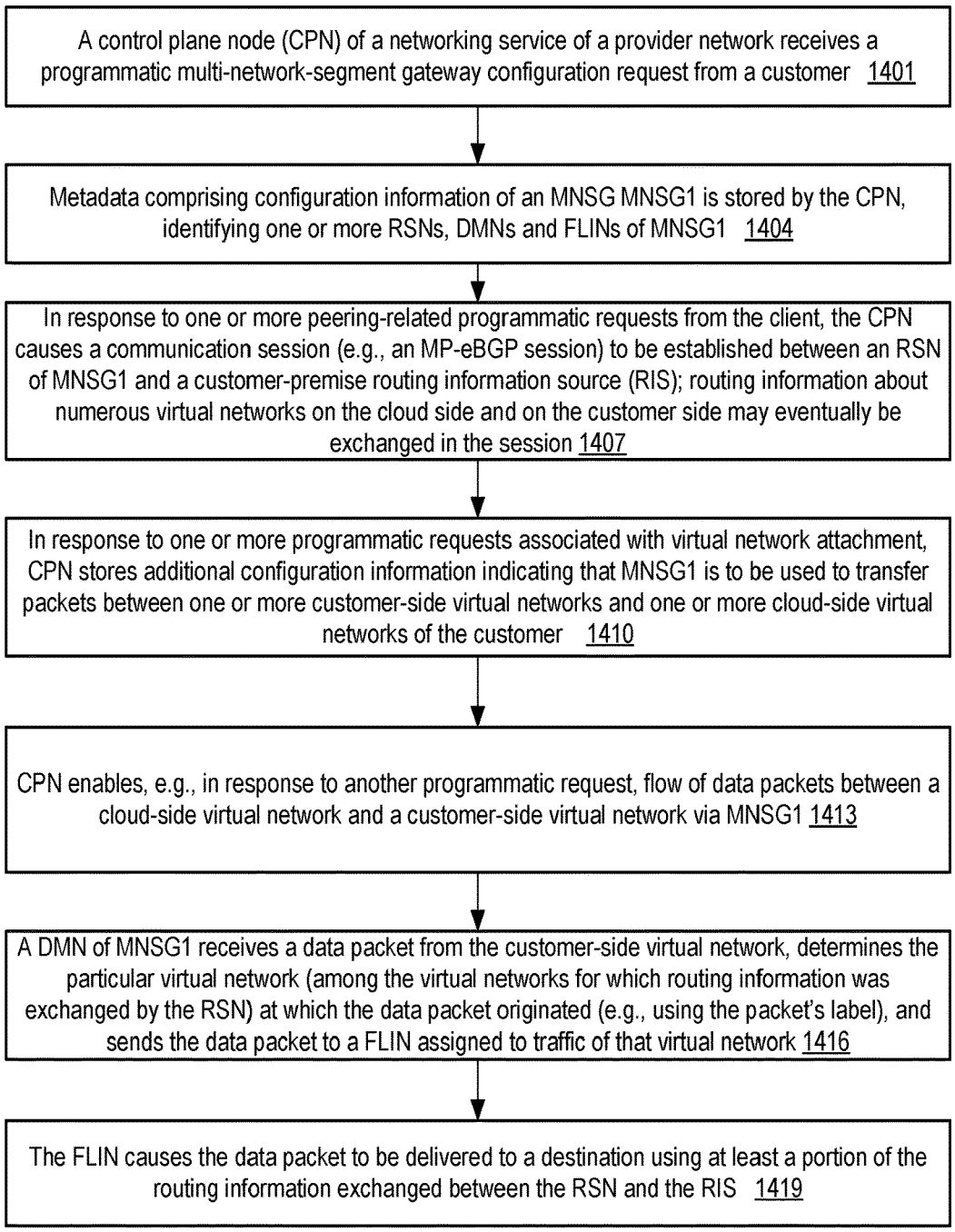
FIG. 14 is a flow diagram illustrating aspects of operations which may be performed in response to programmatic requests submitted by customers of a gateway service, according to at least some embodiments.

FIG. 14 is a flow diagram illustrating aspects of operations which may be performed in response to programmatic requests submitted by customers of a gateway service, according to at least some embodiments. A CPN of a networking service such as an SGS of a provider network may receive a programmatic request (similar to the CreateMNSG message shown in FIG. 11) to configure or establish an MNSG from a customer (element 1401). In response, the CPN may cause configuration information of an MNSG, MNSG1, which is established for use by the customer to be generated and stored at the networking service (element 1404), e.g., at a metadata repository similar to repository 460 shown in FIG. 4. The configuration information may identify one or more RSNs, one or more DMNs, and one or more FLINs that have been assigned to or allocated for MNSG1 in the depicted embodiment.

In response to one or more peering-related programmatic requests (such as a combination of the CustomerPremiseRISPeerForMNSG message and EnableMNSGPeering message shown in FIG. 11), the CPN may cause a communication session (e.g., an MP-eBGP session) to be established between an RSN of MNSG1 and a customer-premise routing information source (RIS) of the customer in various embodiments (element 1407). During the communication session, routing information pertaining to numerous cloud-side virtual networks and numerous customer-side virtual networks may be exchanged, e.g., using labeled messages.

In various embodiments, in response to one or more programmatic requests associated with attachment of virtual networks (cloud-side virtual networks, customer-side virtual networks, or both cloud-side and customer-side virtual networks) to MNSG1, the CPN may cause additional configuration information pertaining to MNSG1 to be stored, indicating that MNSG1 is to be used to transfer packets between a cloud-side virtual network and a customer-side virtual network of the customer (element 1410). Such attachment-related requests may, for example, comprise messages similar to the NewCustomerSideVirtualNetworkInfo, CloudSideVirtualNetworkAttachmentInfo and/or ConfigureRoutingTable messages shown in FIG. 11 and FIG. 12.

The CPN may enable, e.g., in response to another programmatic request such as the EnableDataPacketFlows message of FIG. 12, data packets of various applications being implemented at the customer-side virtual network and the cloud-side virtual network to start flowing in the depicted embodiment (element 1413).

A DMN of MNSG1 may receive a labeled data packet from the customer-side virtual network, and determine (e.g., from the label) at which customer-side virtual network the packet originated (element 1416). The DMN may then select or identify an FLIN which has been designated/assigned by the CPN to handle packet processing for the customer-side virtual network, and send the data packet to that FLIN. Mappings between virtual networks and FLINs may be propagated to the DMN by the CPN and used to identify such FLINs in the depicted embodiment.

The FLIN may cause the data packet, received from the DMN, to be delivered to a destination (e.g., a particular endpoint within a cloud-side virtual network or a customer-side virtual network) using at least a portion of the routing information that was exchanged between the RSN and the RIS in the depicted embodiment (element 1419).

FIG. 15 is a flow diagram illustrating aspects of operations which may be performed to create end-to-end network segments using templates stored at a gateway service, according to at least some embodiments. As shown in element 1501, a customer of an SGS similar in features and functionality to SGS 402 of FIG. 4 may utilize a workflow which includes several programmatic interactions to set up an ENS which includes a customer-side virtual network, a cloud-side virtual network, and an MNSG which provides scalable routing for traffic between the two virtual networks.

A template for setting up similar ENS s may be created and stored at the SGS in the depicted embodiment (element 1504). Such a template may, for example, be created in response to a programmatic request from the customer, or automatically by the SGS control plane without receiving a template creation request. In some embodiments, the template may comprise one or more data structures representing the logical equivalent of a fillable form for specifying various properties of a to-be-created ENS—for example, the template may comprise respective elements which can be filled out to indicate a customer-premise routing information source, an MNSG, a cloud-side virtual network of the ENS, a customer-side virtual network of the ENS, performance requirements of the ENS, availability requirements of the ENS, tenancy preferences for one or more layers of MNSG nodes used for the ENS, and so on.

The customer may be provided access to a set of templates that can be filled out via SGS programmatic interfaces to create new ENS s (element 1507). Some templates may be made accessible to multiple SGS customers, while others may be restricted to use by a single customer or a set of customers. In some embodiments, if a template is created based on the set of programmatic interactions of a particular customer, that customer may be granted the right by the SGS to use that template exclusively, or to allow that template to be provided to other customers. Some customers may request or cause the SGS to store multiple templates, each of which may correspond to a particular type of ENS use case of the customer.

The customer may fill out a selected template when a new ENS is to be established for the customer, and provide the filled out version to the SGS via a programmatic interface (element 1510). The configuration tasks that are needed to establish the new ENS may then be performed by the SGS CPNs using the information in the filled-out version (element 1513), reducing the number of tasks/steps that the customer would have to perform had the template not been used. The filled-out version may for example indicate a particular customer-premise routing information source, a particular MNSG, a particular cloud-side virtual network and a particular customer-side virtual network in the depicted embodiment. As a result of the submission of the filled-out version, in addition to performing other tasks such as metadata and mappings to be stored, the SGS may cause a set of routing information to be exchanged between the particular customer-premise routing information source and an RSN of the particular MNSG. The set of routing information may pertain to endpoints in the particular cloud-side virtual network and/or endpoints in the particular customer-side virtual network, and may be used by the MNSG data plane nodes to transfer data packets between the two virtual networks.

It is also noted that in various embodiments, some of the operations shown in the flow diagrams of FIG. 13, FIG. 14 and/or FIG. 15 may be implemented in a different order than that shown in the figure, or may be performed in parallel rather than sequentially. Additionally, some of the operations shown in FIG. 13, FIG. 14 and/or FIG. 15 may not be required in one or more implementations.

Figure 16:
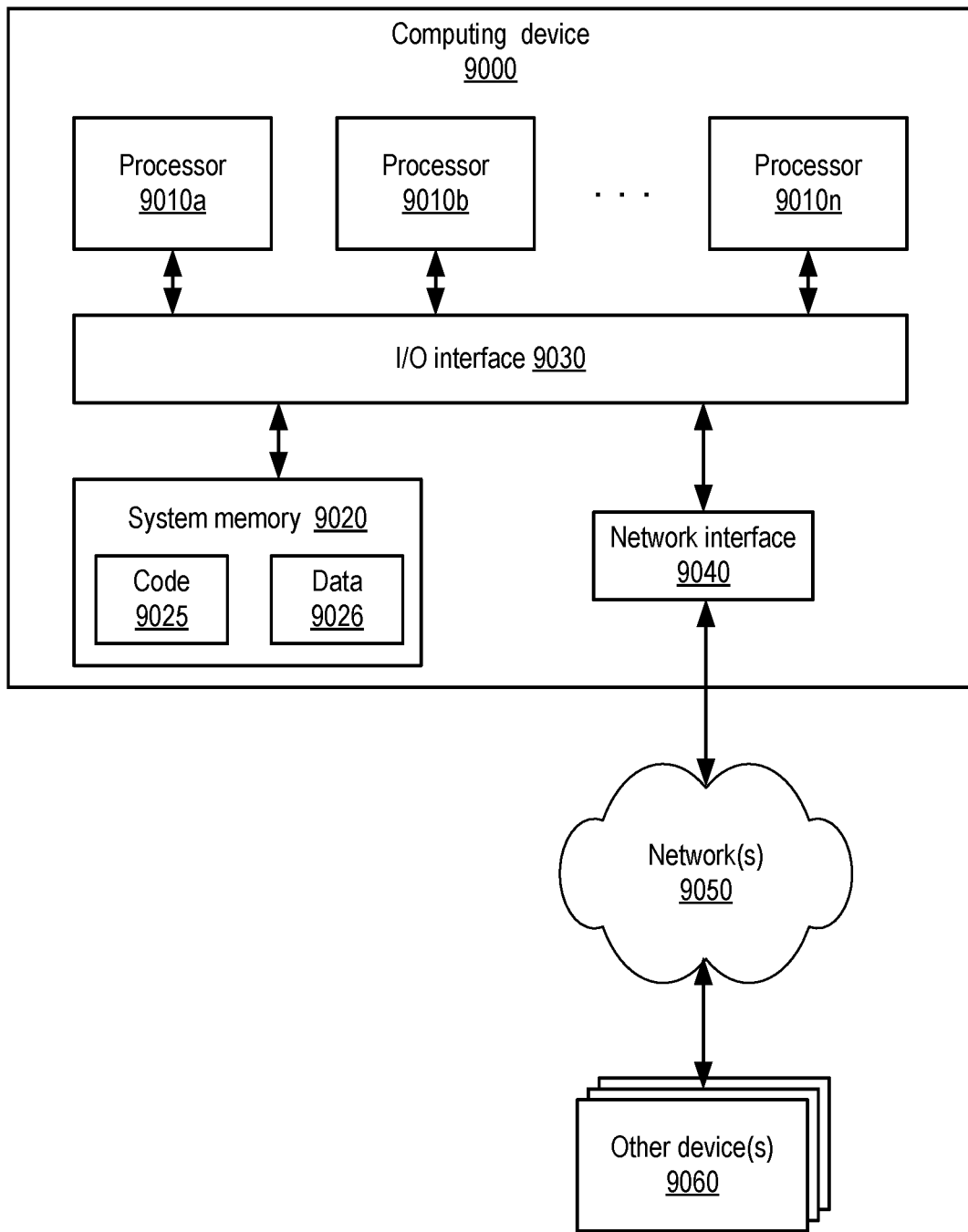
FIG. 16 is a block diagram illustrating an example computing device that may be used in at least some embodiments.

In at least some embodiments, a server that implements the types of techniques described herein (e.g., including the described functionality of SGS nodes, VCS servers and the like), may include a general-purpose computer system that includes or is configured to access one or more computer-accessible media. FIG. 16 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses (including hardware accelerators of various kinds), such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 15, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 15. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electro-magnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a route signaling node of a multi-network-segment gateway of a software-defined gateway service of at a cloud provider network;
    a de-multiplexing node of the multi-network-segment gateway; and
    a set of forwarding logic implementation nodes of the multi-network-segment gateway, including a first forwarding logic implementation node and a second forwarding logic implementation node;
    wherein the route signaling node is configured to:
        obtain, during a communication session established with a customer-premise routing information source located at a premise of a customer of the cloud provider network, respective sets of labeled routing information pertaining to endpoints of a plurality of customer-side network segments of the customer, wherein a first set of labeled routing information of the respective sets of labeled routing information pertains to a first customer-side network segment, and wherein a second set of labeled routing information of the respective sets of routing information pertains to a second customer-side network segment; and
    wherein the de-multiplexing node is configured to:
        transmit, based at least in part on a first label of a first data packet received from the premise of the customer, the first data packet to the first forwarding logic implementation node, wherein the first label is indicated in the first set of labeled routing information and associated with the first customer-side network segment; and
        transmit, based at least in part on a second label of a second data packet received from the premise of the customer, the second data packet to the second forwarding logic implementation node, wherein the second label is indicated in the second set of labeled routing information and associated with the second customer-side network segment;
    wherein the first forwarding logic implementation node is configured to:
        transmit, based at least in part on a mapping between the first customer-side network segment and a first virtual network established within the cloud provider network on behalf of the customer, a first version of the first data packet to a first endpoint within the first virtual network, wherein the first version of the first data packet is generated in accordance with an encapsulation protocol of a virtualized computing service of the cloud provider network; and
        cause, using at least a portion of the first set of labeled routing information, a third data packet which originated at the first endpoint to be delivered to a destination within the first customer-side network segment; and wherein the second forwarding logic implementation node is configured to:

transmit, based at least in part on a mapping between the second customer-side network segment and a second virtual network established on behalf of the customer within the cloud provider network, a second version of the second data packet to a second endpoint within the second virtual network, wherein the second version of the second data packet is generated in accordance with the encapsulation protocol; and cause, using at least a portion of the second set of labeled routing information, a fourth data packet which originated at the second endpoint to be delivered to an endpoint within the second customer-side network segment.

2. The system as recited in claim 1, wherein the route signaling node is further configured to:

establish the communication session with the customer-premise routing information source in accordance with a version or variant of the Border Gateway Protocol (BGP).

3. The system as recited in claim 1, wherein the de-multiplexing node is further configured to:

receive the first data packet in accordance with a version or variant of a Multiprotocol Label Switching (MPLS) protocol.

4. The system as recited in claim 1, wherein the route signaling node is further configured to:

transmit, to the customer-premise routing information source, during the communication session, respective sets of additional routing information pertaining to a plurality of virtual networks established at the cloud provider network on behalf of the customer.

5. The system as recited in claim 1, further comprising a control plane node of the software-defined gateway service, wherein the control plane node is configured to:

automatically assign, to the multi-network-segment gateway, an additional node based at least in part on detecting that a scale-up criterion for the multi-network-segment gateway has been met.

6. A computer-implemented method, comprising:

obtaining, at a route signaling node of a first multi-network-segment gateway of a networking service of a cloud provider network, during a particular communication session established with a first customer-premise routing information source located at a premise of a first customer of the cloud provider network, respective sets of labeled routing information pertaining to a plurality of customer-side network segments of the first customer;

propagating, by the route signaling node, at least a portion of the respective sets of labeled routing information to one or more data plane nodes of the first multi-network-segment gateway; and causing, by the one or more data plane nodes, a data packet received at a particular data plane node of the one or more data plane nodes to be forwarded to a particular destination, wherein the particular destination is selected for the data packet based at least in part on an indication that the data packet is part of traffic associated with a particular customer-side network segment indicated in the portion of the respective sets of labeled routing information.

7. The computer-implemented method as recited in claim 6, further comprising:

establishing the particular communication session in accordance with a version or variant of the Border Gateway Protocol (BGP).

8. The computer-implemented method as recited in claim 6, further comprising:

transmitting, by the route signaling node to the first customer-premise routing information source, during the particular communication session, additional routing information pertaining to a plurality of virtual networks established at the cloud provider network on behalf of the first customer.

9. The computer-implemented method as recited in claim 6, further comprising:

automatically assigning, by a control plane node of the networking service to the first multi-network-segment gateway, an additional data plane node based at least in part on detecting, by the control plane node, that a scale-up criterion has been met.

10. The computer-implemented method as recited in claim 9, wherein detecting, by the control plane node, that the scale-up criterion has been met comprises one or more of: (a) analyzing resource utilization of the one or more data plane nodes or (b) determining that an additional customer-side network segment has been established by the first customer at the premise.

11. The computer-implemented method as recited in claim 6, further comprising:

assigning, by a control plane node of the networking service, the route signaling node to a plurality of multi-network-segment gateways, including the first multi-network-segment gateway and a second multi-network-segment gateway; and obtaining, at the route signaling node, during another communication session established with a second customer-premise routing information source located at a second premise of a second customer of the cloud provider network, respective sets of labeled routing information pertaining to a plurality of network segments of a customer network of the second customer.

12. The computer-implemented method as recited in claim 6, further comprising:

assigning, by a control plane node of the networking service, a particular data plane node of the one or more data plane nodes to a plurality of multi-network-segment gateways, including the first multi-network-segment gateway and a second multi-network-segment gateway, wherein the second multi-network-segment gateway is established on behalf of a second customer of the cloud provider network; and causing, by particular data plane node, another data packet, received from a premise of the second customer, to be forwarded to another destination within the cloud provider network, wherein the other destination is selected for the other data packet based at least in part on an indication that the other data packet belongs to a particular network segment of a plurality of network segments of the second customer.

13. The computer-implemented method as recited in claim 6, further comprising:

receiving the data packet at a data plane node of the one or more data plane nodes in accordance with a version or variant of one of: (a) Multiprotocol Label Switching/ User Datagram Protocol (MPLS/UDP) or (b) Multiprotocol Label Switching/Generic Route Encapsulation (MPLS/GRE).

14. The computer-implemented method as recited in claim 6, wherein causing the data packet to be forwarded to the particular destination comprises:
   generating an encapsulated version of the data packet using an encapsulation protocol of a virtualized computing service of the cloud provider network.

15. The computer-implemented method as recited in claim 6, wherein a data plane node of the one or more data plane nodes comprises at least a portion of a compute instance of a virtualized computing service of the cloud provider network, and wherein the route signaling node comprises at least a portion of another compute instance of the virtualized computing service.

16. A non-transitory computer-accessible storage medium storing program instructions that when executed on a processor:
   obtain, at a route signaling node of a first multi-network-segment gateway of a networking service of a cloud provider network, during a particular communication session established with a first customer-premise routing information source located at a premise of a first customer of the cloud provider network, respective sets of labeled routing information pertaining to a plurality of customer-side network segments of the first customer;
   propagate, by the route signaling node, at least a portion of the respective sets of labeled routing information to one or more data plane nodes of the first multi-network-segment gateway; and
   cause, by the one or more data plane nodes, a data packet received at a particular data plane node of the one or more data plane nodes to be forwarded to a particular destination, wherein the particular destination is selected for the data packet based at least in part on an indication that the data packet is part of traffic associated with a particular customer-side network segment indicated in the portion of the respective sets of labeled routing information.

17. The non-transitory computer-accessible storage medium as recited in claim 16, storing further program instructions that when executed on the processor:
   establish the particular communication session in accordance with a version or variant of the Border Gateway Protocol (BGP).

18. The non-transitory computer-accessible storage medium as recited in claim 16, storing further program instructions that when executed on the processor:
   transmit, by the route signaling node to the first customer-premise routing information source, during the particular communication session, additional routing information pertaining to a plurality of virtual networks established at the cloud provider network on behalf of the first customer.

19. The non-transitory computer-accessible storage medium as recited in claim 16, storing further program instructions that when executed on the processor:
   assign, by a control plane node of the networking service to the first multi-network-segment gateway, an additional data plane node based at least in part on detecting, by the control plane node, that a scale-up criterion has been met.

20. The non-transitory computer-accessible storage medium as recited in claim 16, storing further program instructions that when executed on the processor:
   assign, by a control plane node of the networking service, the route signaling node to a plurality of multi-network-segment gateways, including the first multi-network-segment gateway and a second multi-network-segment gateway; and
   obtain, at the route signaling node, during another communication session established with a second customer-premise routing information source located at a second premise of a second customer of the cloud provider network, respective sets of labeled routing information pertaining to a plurality of network segments of a customer network of the second customer.

* * * * *